United States Patent
Orban

(10) Patent No.: US 9,523,784 B2
(45) Date of Patent: Dec. 20, 2016

(54) DATA PROCESSING SYSTEMS AND METHODS FOR DOWNHOLE SEISMIC INVESTIGATIONS

(71) Applicant: Schlumberger Technology Corporation, Sugar Land, TX (US)

(72) Inventor: Jacques Orban, Gloucestershire (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 604 days.

(21) Appl. No.: 13/719,054

(22) Filed: Dec. 18, 2012

(65) Prior Publication Data

US 2014/0169127 A1    Jun. 19, 2014

(51) Int. Cl.
*G01V 1/40* (2006.01)
*G01V 1/48* (2006.01)
*G01V 1/50* (2006.01)

(52) U.S. Cl.
CPC . *G01V 1/40* (2013.01); *G01V 1/48* (2013.01); *G01V 1/50* (2013.01); *G01V 2210/60* (2013.01)

(58) Field of Classification Search
CPC ............ G01V 2210/60; G01V 2210/43; G01V 2210/45; G01V 1/40; G01V 1/42; G01V 1/48; G01V 1/50
USPC .................................... 367/25, 38; 702/6, 11
See application file for complete search history.

(56) References Cited

U.S. PATENT DOCUMENTS

| | | | |
|---|---|---|---|
| 5,077,697 A * | 12/1991 | Chang | 367/31 |
| 5,372,038 A | 12/1994 | Nicoletis | |
| 5,678,643 A | 10/1997 | Robbins et al. | |
| 7,359,800 B2 * | 4/2008 | Rabinovich et al. | 702/7 |
| 9,081,110 B2 | 7/2015 | Orban et al. | |
| 2004/0122595 A1 | 6/2004 | Valero | |
| 2004/0240320 A1 | 12/2004 | McDonald et al. | |
| 2006/0039238 A1 * | 2/2006 | Mandal et al. | 367/31 |
| 2011/0231097 A1 | 9/2011 | Market | |
| 2012/0026831 A1 | 2/2012 | Michael | |
| 2014/0169129 A1 | 6/2014 | Orban | |

FOREIGN PATENT DOCUMENTS

WO    01/40623    6/2001

OTHER PUBLICATIONS

Kimball et al., "Semblance Processing of Borehole Acoustic array data", Geophysics, vol. 49, No. 3 (Mar. 1984) pp. 274-281.*
International search report for the equivalent PCT patent application No. PCT/IB2013/061063 issued on May 8, 2014.

* cited by examiner

*Primary Examiner* — Ian J Lobo
(74) *Attorney, Agent, or Firm* — Daryl R. Wright; Jody Lynn DeStefanis

(57) ABSTRACT

Methods and systems for investigating a formation surrounding a wellbore. The methods involve a semblance-based analysis of downhole data, for example low frequency downhole data. The semblance-based analysis includes group semblance mapping of the data, followed by single shot semblance map handling, followed by multiple shot data handling. The systems include a seismic source, a seismic receiver, and an electronics system for processing data according to a process including: group semblance mapping, single shot map handling, and multiple shot data handling. The seismic source may generate low frequency signals, and the seismic receiver may be two or more receiver subsystems that include at least two axially spaced-apart hydrophones and at least one multi-component geophone.

20 Claims, 25 Drawing Sheets

DATA PROCESSING SYSTEMS AND METHODS FOR DOWNHOLE SEISMIC INVESTIGATIONS

FIELD

The present disclosure relates to the study of underground formations and structures, for example as it relates to oil and gas exploration. The present disclosure relates more specifically to seismic surveying, including semblance techniques for imaging bed boundaries of subterranean geological formations around the wellbore.

BACKGROUND

Borehole seismic investigation is of interest to oil and gas exploration professionals because it can provide a deeper view into a formation than other available investigation techniques. However, current borehole seismic methods can face limitations in their implementation. For example, borehole seismic survey systems may involve sources located at the surface and receivers placed in the well. Other configurations may be possible, for example the drill bit can function as the seismic source and receivers can be placed at the surface. In either case, the distance between source and receivers can result in attenuation and loss of resolution. Such systems may also be economically challenging, as drilling should be stopped and the surveys often take extended time periods. In vertical seismic systems, there may be further challenges resulting from converting the time data into depth information.

SUMMARY

The present disclosure provides data processing methods and systems for borehole seismic investigation, including low frequency data processing systems and methods for acquiring images around the wellbore and ahead of the drill bit, and including systems and methods for processing data which is acquired while drilling the borehole. In some embodiments, the methods and systems facilitate determination of the position (distance and angular positions) of a bed boundary (reflector) around and ahead of a drill string in the wellbore. In further embodiments, the methods and systems are configured to determine the position of a limited number (e.g., 10 or less) of reflectors in the vicinity of the wellbore (e.g., about 500 meters or less). In other embodiments, the processing is based on receiver group forming via "semblance processing" between seismic sensors to determine the arrival of signals from given seismic reflectors. In further embodiments, the processing enables separation of various detected arrivals in several propagation categories for determination of one or more of: formation seismic velocity, propagation in the borehole itself, beam steering to determine angular position of the reflector versus the seismic receivers, the determination of the distance to the given reflector, and the dip of the reflector versus the wellbore.

In some embodiments, the methods of investigating a formation surrounding a wellbore include: firing a seismic source; recording data relating to acoustic waves generated by the seismic source using one or more groups of one or more downhole receivers; and processing the recorded data according to a semblance technique involving group semblance mapping, single shot semblance map handling, and multiple shot data handling to determine the location or orientation of one or more bed boundaries. In some embodiments, where the methods involve using at least two groups of receivers, the recorded data is normalized to a common reference axis using a coordinate rotation process. In some embodiments, the methods further involve optimizing the number of downhole receivers in a group. In some embodiments, the methods further involve identifying the location, orientation, or both of no more than ten bed boundaries, each of which is no greater than about 500 meters around or ahead of the wellbore.

In some embodiments, the methods use a downhole acoustic source, which is integrated into the drill string, for example the acoustic source may include at least two force-generating members retractably connected to a drill-string tubular at substantially the same axial position. The acoustic source may also include a control system (downhole or at surface) for activating the at least two force-generating members to engage the wellbore (including a casing of the wellbore) and transmitting a seismic signal which may be a swept frequency signal ranging up to about 700 Hz, or from about 5 Hz to about 500 Hz.

In some embodiments, the methods use a downhole acoustic source, for example as described above, and/or a downhole receiver system. In some embodiments, the downhole receiver system includes one or more groups of receivers (for example two to six groups of receivers) integrated into the drill string, where each group of receivers includes at least two, same-type, axially spaced-apart hydrophones affixed to a drill-string tubular, at least one multi-component geophone also affixed to the drill-string tubular, and mechanical elements for stable acoustic coupling of the receivers to a seismic signal generated by the seismic source and travelling through the formation. In some embodiments, the distance between same-type receivers within a group ranges from about 3 m to about 10 m, and the distance between groups of receivers (measured from center point to center point) ranges from about 10 m to about 100 m, or from about 30 m to about 70 m. In some embodiments, each of the same-type receivers in a group is equally spaced-apart along the drill-string tubular.

In some embodiments, the systems for investigating a formation surrounding a wellbore include: a seismic source, which can be downhole or at the surface; one or more groups of one or more downhole receivers; a surface electronics subsystem and a downhole electronics subsystem, where the surface and downhole electronics systems cooperate to process data recorded by the one or more groups of downhole receivers according to a process which includes: group semblance mapping, single shot semblance map handling, and multiple shot data handling to detect the location, orientation, or both of bed boundaries. In some embodiments, the systems are configured to detect the location, orientation, or both of no more than ten bed boundaries that are up to about 500 meters around or ahead of the wellbore. In some embodiments, the systems also include at least one sensor configured to determine the orientation of each of the one or more groups of downhole receivers relative to the earth's gravity vector, earth's magnetic vector or both.

In some embodiments of systems according to this disclosure, the acoustic source is a downhole acoustic source, which is integrated into the drill string, for example the acoustic source may include at least two force-generating members retractably connected to a drill-string tubular at substantially the same axial position. The acoustic source may also include a control system (downhole or at surface) for activating the at least two force-generating members to engage a wellbore (including a casing of a well-bore) and transmitting a seismic signal which may be a swept frequency signal ranging up to about 700 Hz, or from about 5 Hz to about 500 Hz.

In some embodiment of systems according to this disclosure, the one or more groups of downhole receivers include from two to six groups of receivers, which are integrated into the drill string, and where each group of receivers includes at least two, same-type, axially spaced-apart hydrophones affixed to a drill-string tubular, at least one multi-component geophone also affixed to the drill-string tubular, and mechanical elements for stable acoustic coupling of the receivers to a seismic signal generated by the seismic source and travelling through the formation. In some embodiments, the distance between same-type receivers within a group ranges from about 3 m to about 10 m, and the distance between groups of receivers (measured from center point to center point) ranges from about 10 m to about 100 m, or from about 30 m to about 70 m. In some embodiments, each of the same-type receivers in a group is equally spaced-apart along the drill-string tubular.

The identified embodiments are exemplary only and are therefore non-limiting. The details of one or more non-limiting embodiments according to the disclosure are set forth in the accompanying drawings and the descriptions below. Other embodiments according to the disclosure should be apparent to those of ordinary skill in the art after consideration of the present disclosure.

DETAILED DESCRIPTION

Figure 1:
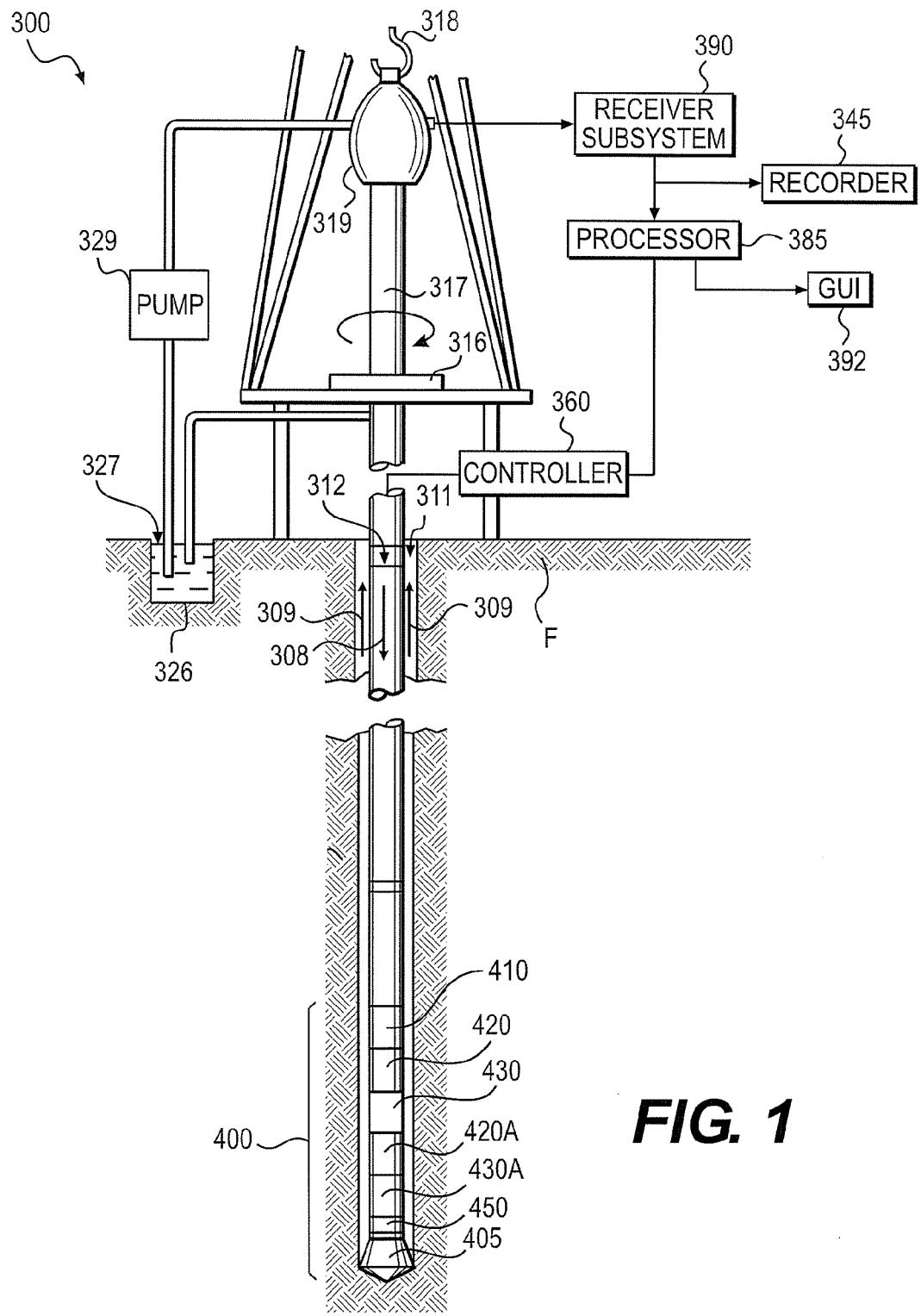
FIG. 1 is a partial schematic representation of an exemplary apparatus for measurement while drilling that is compatible with the devices, systems and methods of this disclosure.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrases "for example," "such as," "including" and the like are used herein, the phrase "and without limitation" is understood to follow unless explicitly stated otherwise. Therefore, "for example a mud turbine generator" means "for example and without limitation a mud turbine generator."

The terms "comprising" and "including" and "involving" (and similarly "comprises" and "includes" and "involves") are used interchangeably and mean the same thing. Specifically, each of the terms is defined consistent with the common United States patent law definition of "comprising" and is therefore interpreted to be an open term meaning "at least the following" and also interpreted not to exclude additional features, limitations, aspects, etc.

The term "about" is meant to account for variations due to experimental error. The term "substantially" is meant to permit deviations from the descriptive term that don't negatively impact the intended purpose. All measurements or numbers are implicitly understood to be modified by the word about, even if the measurement or number is not explicitly modified by the word about. All descriptive terms are implicitly understood to be modified by the word substantially, even if the descriptive term is not explicitly modified by the word substantially.

The terms "wellbore" and "borehole" are used interchangeably.

The phrases "seismic receiver system," "network of seismic receiver subsystems," "receiver system" and "network of receiver subsystems" are used interchangeably.

The phrases "receiver subsystem," "seismic receiver subsystem," "receiver sub," "seismic receiver sub," and "groups of receivers" are used interchangeably.

"Tubular" and "drill-string tubular" are used interchangeably.

"Measurement While Drilling" (MWD) can refer to devices for measuring downhole navigation parameters allowing location of the drilling assembly contemporaneously with the drilling of the well and for performing telemetry to the surface of downhole measurement. "Logging While Drilling" (LWD) refer to devices concentrating on the measurement of formation parameters. That is, both terms are understood as related to the collection of downhole information generally, to include, for example, both the collection of information relating to the position of the drilling assembly and the collection of formation parameters.

The terms "connected," "attached," "affixed" or the like are understood to be modified by "directly or indirectly." In other words, if A is attached to B, it may be directly attached to B or indirectly attached to B through additional components.

This disclosure is directed at data handling and processing (together, "processing") related to seismic acquisition in a wellbore and generated by a downhole or surface source. The data acquisition may be performed during the drilling process. In such applications, the number of seismic sensors and number of shots may be limited for each position of the receivers in the wellbore. In some embodiments, the processing methods and systems are directed at detecting the distance and/or orientation of a limited number of bed boundaries (reflectors), for example ten or less reflectors, in the vicinity of the wellbore (for example up to about 500 meters around and ahead of the wellbore). In some embodiments, the systems and methods are based on receiver group forming via "semblance processing" between seismic sensors, and are used to determine the arrival of signals from seismic reflectors. The results of the processing may allow separation of various detected signals in several propagation categories such that one or more of: seismic wave-front propagation via wave propagating in formation along the wellbore, propagation in the wellbore itself, beam steering to determine the angular position of the reflector versus the seismic receivers, distance to the given reflection, and/or the dip of the reflector versus the wellbore, may be determined.

In some embodiments, the processing systems and methods are implemented on low frequency seismic data gathered downhole (for example generated by a seismic source integrated with the drill string and BHA and/or obtained by a receiver system integrated with the drill string and BHA) for imaging the formation around the wellbore and/or ahead of the drill bit, among other possibilities. "Low frequency data" refers to data relating to a low frequency seismic signal ranging up to about 500 Hz, even up to about 700 Hz when the harmonic from the transmitted signal is included, or from about 7 Hz to about 500 Hz, or up to about 400 Hz, or from about 100 Hz to about 250 Hz. In some embodiments, the data handling and processing systems and methods according to this disclosure may be performed with a downhole seismic source such as described in related application entitled "DEVICES, SYSTEMS AND METHODS FOR LOW FREQUENCY SEISMIC BOREHOLE INVESTIGATIONS" (U.S. Pat. No. 9,081,110) filed concurrently herewith and a downhole seismic receiver system such as described in related application entitled "DOWNHOLE RECEIVER SYSTEMS AND METHODS FOR LOW SEISMIC INVESTIGATIONS" (U.S. application Ser. No. 13/719,081) filed concurrently herewith. In some embodiments, the seismic systems (the processing systems, the receiver systems, and/or the seismic sources) are built into the drilling tubular. FIG. 1 illustrates a non-limiting, exemplary well drilling system equipped with well logging system used to obtain well data and other information in which the processing systems according to this disclosure, the downhole seismic receiver systems, and/or the downhole sources may be integrated.

As shown in FIG. 1, a land-based platform and derrick assembly (drilling rig) 300 and drill string 312 with a well data acquisition and logging system, are positioned over a wellbore 311 for exploring a formation F. In the illustrated embodiment, the wellbore 311 is formed by rotary drilling. Those of ordinary skill in the art given the benefit of this disclosure will appreciate, however, that the subject matter of this disclosure also finds application in directional drilling applications as well as rotary drilling, and is not limited to land-based rigs.

The drill string 312 is suspended within the wellbore 311 and includes a drill bit 405 at its lower end. The drill string 312 is rotated by a rotary table 316, energized by means not shown, which engages a kelly 317 at the upper end of the drill string 312. The drill string 312 is suspended from a hook 318, attached to a travelling block (also not shown), through the kelly 317 and a rotary swivel 319 which permits rotation of the drill string 312 relative to the hook 318.

Drilling fluid or mud 326 is stored in a pit 327 formed at the well site. A pump 329 delivers the drilling fluid 326 to the interior of the drill string 312 via a port in the swivel 319, inducing the drilling fluid to flow downwardly through the drill string 312 as indicated by the directional arrow 308. The drilling fluid 326 exits the drill string 312 via ports in the drill bit 405, and then circulates upwardly through the region between the outside of the drill string 312 and the wall of the wellbore, called the annulus, as indicated by the direction arrows 309. In this manner, the drilling fluid 326 lubricates the drill bit 405 and carries formation cuttings up to the surface as it is returned to the pit 327 for recirculation.

The drill string 312 further includes a bottom hole assembly ("BHA") 400, near the drill bit 405 (for example, within several drill collar lengths from the drill bit). The BHA 400 includes capabilities for measuring, processing, and storing information, as well as communicating with the surface. The BHA 400 thus may include, among other things, one or more logging-while-drilling ("LWD") modules 420, 420A and/or one or more measuring-while-drilling ("MWD") modules 430, 430A. The BHA 400 may also include a rotary-steerable system and/or motor 450.

The LWD and/or MWD modules 420, 420A, 430, 430A can be housed in a drill collar, and can contain one or more types of logging tools for investigating well drilling conditions or formation properties. The logging tools may provide capabilities for measuring, processing, and storing information, as well as for communication with surface equipment.

The BHA 400 may also include a surface/local communications subassembly 410, which may be configured to enable communication between the tools in the LWD and/or MWD modules 420, 420A, 430, 430A and processors at the earth's surface. For example, the subassembly 410 may include a telemetry system that includes an acoustic transmitter that generates an acoustic signal in the drilling fluid (a.k.a. "mud pulse") that is representative of measured downhole parameters. The acoustic signal is received at the surface by instrumentation that can convert the acoustic signals into electronic signals. For example, the generated acoustic signal may be received at the surface by transducers. The output of the transducers may be coupled to an uphole receiving system 390, which demodulates the transmitted signals. The output of the receiving system 390 may be coupled to a computer processor 385 and a recorder 345. The computer processor 385 may be coupled to a monitor, which employs graphical user interface ("GUI") 392 through which the measured downhole parameters and particular results derived therefrom are graphically or otherwise presented to the user. In some embodiments, the data is acquired real-time and communicated to the back-end portion of the data acquisition and logging system. In some embodiments, the well data may be acquired and recorded in the memory in downhole tools for later retrieval.

The LWD and MWD modules 420, 420A, 430, 430A may also include an apparatus for generating electrical power to the downhole system. Such an electrical generator may include, for example, a mud turbine generator powered by the flow of the drilling fluid, but other power and/or battery systems may be employed additionally or alternatively.

The well-site system is also shown to include an electronics subsystem having a controller 360 and a processor 385, which may optionally be the same processor used for analyzing logging data and which together with the controller 360 can serve multiple functions. For example, the controller 360 and processor 385 may be used to power and operate the logging tools such as the seismic investigation tool mentioned below. The controller and processor need not be on the surface as shown but may be configured in any suitable way. For example, alternatively, or in addition, the controller and/or processor may be part of the MWD (or LWD) modules or part of the drill string carrying the seismic investigation tool or seismic sources or seismic receiver subsystems.

In some embodiments of systems and methods according to this disclosure, the electronics subsystem (whether located on the surface or sub-surface on or within the tool or some combinations thereof) includes a processor configured for (for example including machine-readable instructions for) analyzing the distance and/or orientation of bed boundaries from data collected by seismic receivers. In some embodiments, the processor is configured to analyze data collected by seismic receivers in response to low frequency seismic signals (for example up to about 500 Hz or for example from about 5 Hz up to about 500 Hz) generated by a low frequency seismic vibrator. In further low frequency embodiments, the processor is configured to analyze up to about 10 bed boundaries and up to about 500 meters around and ahead of the drill bit. In yet further embodiments, the processor may also include one or more of clock synchronization protocols and machine-readable instructions for data reduction in advance of transmission.

In some embodiments according to this disclosure, in addition to including a processor for determining the distance and/or orientation of bed boundaries, for example from data gathered by seismic receivers responding to low frequency seismic signals, the systems can also include a downhole seismic source integrated into the drill string (for example BHA), which downhole source is described in a co-pending application, filed concurrently herewith, also assigned to Schlumberger, and entitled: "Devices, Systems, and Methods for Low Frequency Seismic Borehole Investigations." The referenced co-pending seismic source application is hereby incorporated by reference in its entirety.

In some embodiments according to this disclosure, in addition to including a processor for determining the distance and/or orientation of bed boundaries, for example from data gathered by seismic receivers responding to low frequency seismic signals, the systems can also include a receiver system having one or more receiver subsystems configured to gather data generated by low frequency seismic sources, which is integrated into the drill string (for example BHA), and which receiver system is described in a co-pending application, filed concurrently herewith, also assigned to Schlumberger, and entitled: "Downhole Receiver Systems and Methods for Low Frequency Seismic Investigations." The referenced co-pending receiver application is hereby incorporated by reference in its entirety. Embodiments of the receiver system are briefly described below in the: "System" section.

In some embodiments according to this disclosure, the systems include a processor for determining the distance and/or orientation of bed boundaries, for example from data gathered by seismic receivers responding to low frequency seismic signals in addition to both a source as described in the referenced co-pending application as well as a receiver system as described in the referenced co-pending application.

As previously mentioned, the seismic system may be built into the drill-string tubular. With respect to downhole integrated seismic receiver system embodiments, in some embodiments, several seismic receiver subsystems ("subs") may be included in the drilling system to constitute the overall seismic receiver system (or seismic antenna). The receiver subs may include at least two seismic sensors of the same type, for example, at least two hydrophones, or at least two geophones, or at least two accelerometers, which sensors are affixed to a drill-string tubular and may be axially spaced-apart from one another. The processing methods may be directly performed on the received data of similar sensors at various positions in the receiver system to determine signal arrivals with recognition of the type of wave propagation, allowing determination of the reflector's position (for example including distance and angular position versus the drilling tubular).

In some embodiments, the receiver system includes two or more, for example from two to six receiver subsystems, with each receiver sub having at least two axially spaced-apart, same-type seismic sensors. When multiple receiver subsystems are used in the drilling tubular, the distance between receiver subsystems is chosen to facilitate a depth of view into the surrounding formation ranging up to about 500 m. The accuracy for distance estimation may be in the range of about 10 to 20 meters. In some embodiments, the sampling rate may be about 1 millisec or higher to insure high accuracy while cumulating all types of errors, including the effect of processing. Accordingly, in some embodiments, the most distant subsystems may be separated by about 500 m. In some embodiments of the seismic receiver system, the axial distance between each receiver subsystem is measured from the center of one subsystem to the center of a neighboring subsystem and can range, for example, from about 10 m to about 100 m, or from about 30 m to about 70 m, or from about 10 m to about 70 m.

In some embodiments, the axial distance between seismic sensors within a receiver subsystem is chosen to facilitate recognition of similar signals shifted by small delta-time versus arrival time. In some embodiments, the distance between receivers within a subsystem ranges from about 3 m to about 10 m. In some embodiments, data may be sampled at about 5000 sample/sec and with an amplitude resolution of about 20 bits or more so that the incident angle for the arrival of the seismic signal onto a single receiver subsystem can be estimated with accuracy of about 20 degrees or more.

In some embodiments of the seismic receiver system, each receiver subsystem includes at least two same-type seismic sensors such as at least two multi-component geophones (for example at least two 2 components (2C) geophones or at least 2 pairs of geophones with different orientations, for example 90 degrees from each other, or at least two 3C geophones, or at least one 2C geophone and at least one 3C geophone), at least two multi-component accelerometers (for example at least two 2C accelerometers, or at least two 3C accelerometers, or at least one 2C accelerometers and at least one 3C accelerometer), at least two hydrophones or combinations thereof. In further embodiments, each sensor corresponding to the same-type sensors is axially distributed along a drill-string tubular. In some embodiments, the receiver subsystem includes either two 3C geophones (or 3C accelerometers), or two 2C geophone (or 2C accelerometers), and two or three or four hydrophones, where the geophones (or accelerometers) are axially spaced apart from one another along the central tool body, and the hydrophones are axially spaced apart from one another along the drill-string tubular.

In further embodiments, the receiver subsystem also includes a device, such as a stabilizer or a coupling pad assembly for coupling the geophones to the formation. In further embodiments, the receiver subsystem is integrated into a drill-string tubular which itself has one, two or more flex joints, for example, two flex joints flanking a central tool body. These flex-joints may improve the coupling of the receiver sub to the formation, while reducing the radial resonance of the drill-string.

In other embodiments, the receiver subsystem is equipped with sensors designed to determine the orientation of the seismic receiver subsystem versus the earth gravity vector and/or the earth magnetic vector in order to enable a vectorial rotation of the seismic measurements to normalize measurements of different receiver subs into a unique system of reference axes (such as Vertical axis, North Axis and South axis, or in reference with the local wellbore trajectory) so that all seismic data corresponding to one axis can be processed together to form consistent images. In particular, when "semblance processing" is performed on seismic data corresponding to different receiver subs, the processing is performed on the data corresponding to the same reference axis.

In some processing embodiments, the references axes include a first (main) axis that is "quasi parallel" to the borehole axis over the "data-processing distance" and a second axis that is perpendicular to the "main axis" and in the vertical plane if the main axis has an inclination above ~7 degrees. The reference axes can also include a third axis that is orthogonal to the first and second axes. When the inclination of the main axis is less than ~7 degrees, the second axis could be in plane of North azimuth.

In some embodiments, there are also the systems and methods for transmitting data to the surface. In some embodiments, the data is transmitted using wired-drill-pipe telemetry. In some embodiments, the data is transmitted using an MWD system. In some embodiments, the methods include first reducing the data, for example using downhole processing such as semblance analysis at the sensor groups, followed by a processing for reflector best placement for the multi-groups of one single shot, and to identify a set of parameters for the reflectors before transmitting the data to the surface. A further processing step may be performed to improve the definition of the reflectors by combining data related to multiple shots: this step may be processed at surface. In other words, in some embodiments, methods according to the disclosure involve: first, group semblance mapping; second, single shot semblance map handling; and optionally followed by multiple shot data handling.

In some embodiments, "group semblance mapping" involves receiver group forming via "semblance processing" between seismic traces (data corresponding to different receivers) to determine the arrival of signal from given seismic reflector. The results of the processing may allow separation of various detected arrivals in several propagation categories enabling determination of formation seismic velocity, propagation in the borehole itself, beam steering to determine position (distance and angles) of the reflectors versus the seismic receivers and/or sources, and possibly also the dip of the reflector versus the wellbore. In some embodiments, "semblance processing" enables detection of seismic signal even when signal-to-noise ratio is low. The second step, "single shot semblance map handling", in some embodiments is about creating a common "semblance map" related to the data of a single shot for the set of groups of receivers available in the seismic system. Base on this common set of data, the reflector detections can be improved.

When multiple receiver subs are used, which are distributed along the BHA and the drill-string, and which include 2C or 3C geophones or accelerometers, the processes and systems can also involve coordinate rotation for the seismic data to represent the measured seismic vector received by multi-component geophones (accelerometers) in a common set of reference axes. In further embodiments, the wellbore trajectory (for non-straight sections) is taken into account for the proper location of the reflectors: different methods are to be used when 3C receivers are used in place of other type of receivers.

In some embodiments, the first and second steps, "group semblance mapping" and "single shot semblance map handling," are performed downhole (e.g., at single group and at single shot level). The output of the semblance map may then be transmitted to the surface, for example, by MWD telemetry. This methodology results in data reduction, allowing for data transfer via the low bit rate MWD telemetry. By example, a record of 3 sec for 6 sensors at 24 bit and 5000 sample/sec corresponds to 2,160,000 bits. Each peak of the "semblance map" may require 5 pieces of information (T, $\Delta$T, semblance coefficient, peak sharpness, error). Supposing they are defined at 0.1% each (equivalent to 10 bit words), this corresponds to 50 bits per peak, or 500 bits for 10 reflectors. The data reduction coefficient may then be in the range of about 4,000 (2,000,000/50).

In some embodiments, the third step, "multiple shot data handling," involves combining the seismic information (after "semblance processing" at shot level) between shots, for example, to characterize the reflector with improved 3D positioning and shape while also improving the signal-to-noise ratio. This multiple shot processing is performed in the "combined semblance map" by defining the "line of peaks" between multiple "group semblance maps." In some embodiments, multiple shot processing is performed after converting the axes (T and $\Delta$T) of the basic "semblance map" into "incidence angle $\alpha$" and "distance to reference" (either the receivers or the downhole source). In some embodiments, where multiple shots and different positions are used to map the reflectors, the multiple shot processing utilizes wellbore trajectory and drill-string positions (and source position) in the wellbore.

The processing of "line of peaks" is about the fitting of a representation of the reflector (e.g., a polynomial law of N degrees). The fitting process may include all information available in basic "semblance maps" of multiple groups and shots and may allow the selection of the best reflector model in view of minimizing the fitting errors. The fitting error formula may include weighing effects based on the "semblance coefficient for the peak," the "peak sharpness," and the "accuracy limits" for the "incident angles."

In some embodiments, data related to multiple shots with a drill-string at different positions in the wellbore during shots can be combined for improved characterization of a reflector (for example in the case of a low signal-to-noise ratio and/or for detection/positioning of a reflector ahead of the drill-bit and/or for distant reflectors around the wellbore).

In some embodiments, as a further optional step, the number of receivers in a digital group (to be processed in each "semblance mapping" process) can be optimized between spatial resolution (the sensor group should be as short as possible) and adequate signal-to-noise ratio to have stable reflection detection and positioning with minimum error. In some embodiments, methods in accordance with the disclosure include a process to adapt the number N of consecutive sensors (defining the group length) for the semblance processing. If N is too small, the random noise reduces the quality of the correlation, while if N is too large, the geometrical seismic signal may damage the semblance quality. The proposed processing can include iteration on the number N to include in the semblance processing. In practical application, the minimum group length corresponds to the seismic sensors of one receiver sub. The increment for grouping is at the receiver sub level: so N=K*J where N=number of sensors for grouping by "semblance processing"

K=number of one type sensors in one receiver sub

J=number of receiver subs combined in one group

In some embodiments, an application of the output of semblance processing is to allow data quality control and noise removal from the reflector signal. This applies to signals travelling along the wellbore (such as "steel arrival" and "tube waves" which can arrive at same time as reflector signals: these "along the wellbore" signals would be considered as "noise." The signals can be characterized in every subsystem, and then exchanged between subsystems. Prediction by "semblance" can be performed to predict the "along the wellbore" signal versus time in a given sub-receiver, which is currently receiving at the same time a reflector signal. This predicted "along the wellbore" signal is first an information for quality control as risk as noise in the reception of the reflected signal. Furthermore, this predicted "along the wellbore" signal can be subtracted from the total received signal in that sub. In some embodiments, this implementation is applied to embodiments having hydrophones.

Accordingly, in some embodiments, the overall processing is performed in multiple steps which can be distributed between downhole and uphole. As already mentioned, in some embodiments, step 1 ("group semblance mapping") and step 2 ("shot semblance map handling") are performed downhole (when data are transmitted with MWD telemetry), whereas step 3 (multiple shot data handling) is performed at the surface computer. If the group of sensors extends over multiple receiver subsystems, coordinate rotation is performed before the "semblance processing" for direction sensitive sensors, and data is exchanged between the subsystems of the same group. In some embodiments, the prediction of "along the wellbore" signal can be performed downhole, but it involves data exchange between downhole receiver subsystems.

In some embodiments, these processing steps are performed by an efficient algorithm allowing fast delivery of the reflector localization (within minutes after data acquisition) despite limited CPU power computing system. When processing is performed downhole, each reflector may be characterized by a limited amount of information (distances, angular positions, energy in semblance window (with sign), semblance coefficient, sharpness, error of positioning . . . ) which can either be transmitted in real-time by MWD telemetry or stored in downhole memory. In some embodiments, the processes according to the disclosure differ from conventional processes in that conventional seismic processing used in surface seismic imaging or for borehole seismic produces images of a wide number of reflectors with a wide range of orientations. In some embodiments, the methods according to this disclosure are well-suited for wellbore placement in proper geological target by focusing on near-wellbore reflectors.

In addition to a processor, and/or a receiver system, and/or a source, the systems in accordance with this disclosure may in some embodiments also include a clock synchronization system and a data management system. The data management system may include means for downhole data processing for data reduction and/or storage. The data management system may be associated with a communication system, either to transmit the data to surface via cable based communication such as with a wireline system or a wired-drill-pipe telemetry system, or to transmit the data via a local downhole network or a downhole central unit, for transmitting some or all of the data to the surface via MWD telemetry, or the data management system may include a data reduction system to identify a subset of reflectors in order to transmit only that subset of information to the surface.

Figure 2:
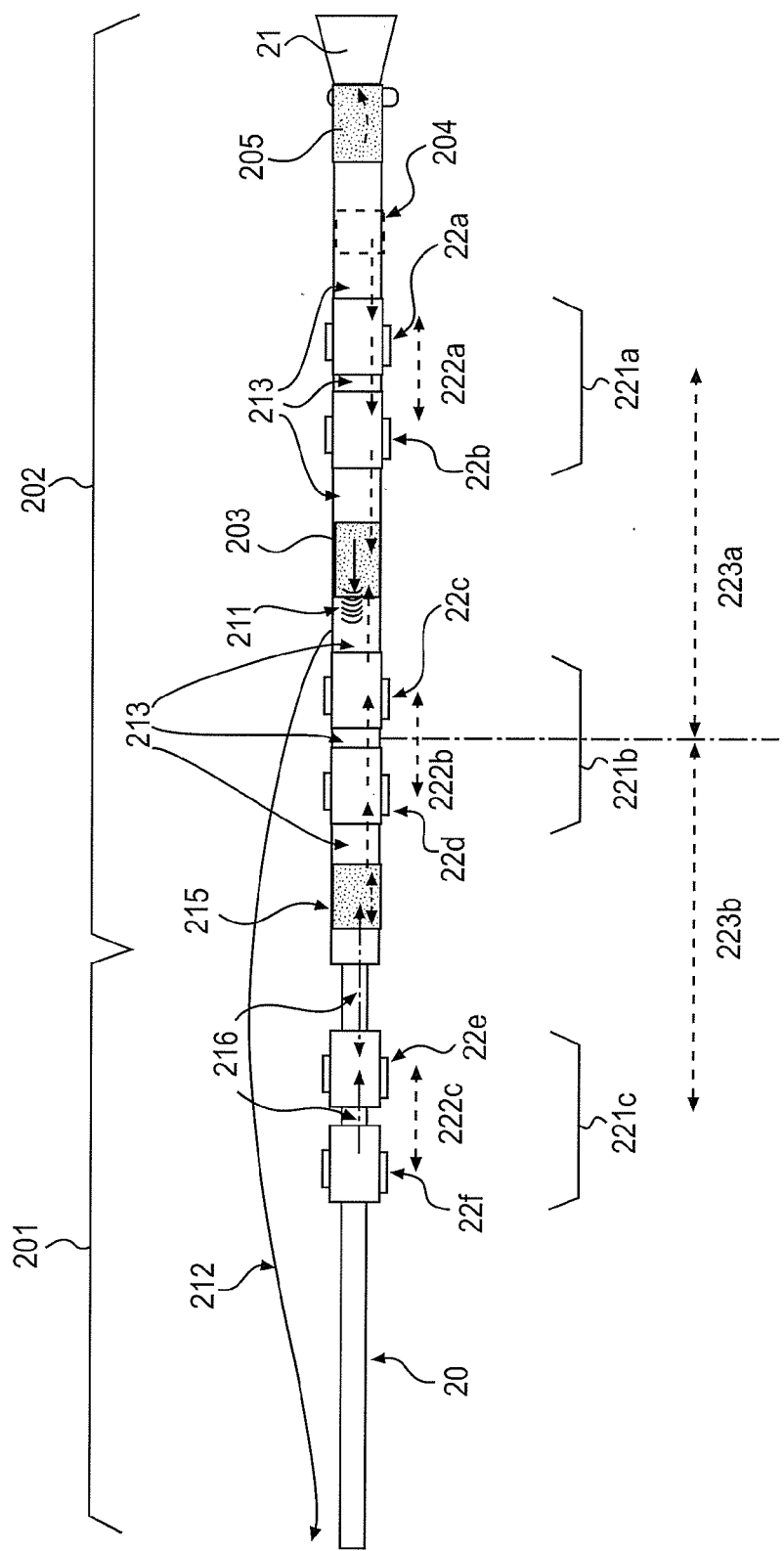
FIG. 2 is a schematic illustration of an embodiment of a seismic receiver system, which can be used with deices, systems and methods in accordance with this disclosure.

The receiver subs previously referred to are described in more detail in connection with FIGS. 2 and 3. FIG. 2 is a schematic diagram of a drill string 20, made of a drill-pipe section 201 from the surface to the Bottom Hole Assembly (BHA) 202 and the drill-bit 21. The BHA 202 may include a measurement-while-drilling ("MWD") system 203 which performs communication to surface 212 using mud-pulse telemetry 211. The MWD 203 may include a system for providing real-time navigation information. The MWD 203 also typically communicates with other LWD subsystems ("subs") (such as 204) to gather measured data from the LWD subs 204 (shown as single sub) via a local tool bus (LTB) 213. The MWD 203 transmits data set to surface, which data set may include data from the LWD subs 204 installed in the BHA 202. The BHA 202 can also include a rotary steerable system (RSS) 205 installed directly above the bit 21. This RSS 205 may communicate with MWD 203 via the LTB 213 or other specific e-mag telemetry to a receiver (not shown) linked to the MWD 203 via the LTB 213.

In some embodiments, the receiver system used to gather data for processing by the systems and methods according to this disclosure is the receiver system for gathering low frequency seismic data including six receiver subs 22a, b, c, d, e, f. (The processing systems and methods may be used with a similar receiver system having a different number of such receiver subs, for example one, two, three, four, or five such receiver subs; or the processing systems and methods may be used on data gathered by other receiver systems altogether.) The illustrated downhole receiver subs 22a, b, c, d, e, f operate similar to other LWD subs (such as 204 which could be placed in multiple positions in the BHA 202) and are therefore compatible with the LTB 213 data exchange system to the MWD 203.

In some embodiments, the seismic receiver subs 22a, b, c, d, e, f are installed in the BHA 202. However, if larger spacing is suggested for desired signal reception, some seismic receiver subs (shown here as 22e,f) can be installed in the drill-pipe section 201. With some communication schemes, longer spacing to the receiver subsystems in the drill-pipe section may require an adapted data exchange system 216: such data exchange system can be based on the Intelliserv wired-drill-pipe system. In some embodiments, an adaptor sub 215 may be used to insure the proper relay of information between the communication systems 216, 213.

Each receiver subsystem 22a,b,c,d,e,f is equipped with an electronics system which includes a CPU, memory, analog-to-digital convertor (ADC) and clock which controls the timing of data acquisition of the ADC, and a system for maintaining the stability of the clock over the duration of the data acquisition period. The electronics may also support data exchange between subs via networking.

In some embodiments, the receiver subs 22a,b,c,d,e,f are organized in groups 221a, b, c. In the illustrated embodiment, three groups of two receiver subs are shown. However, the number of groups and number of subs within a group can vary. For example, the number of groups could range from one to ten, with each group including from one to five receiver subs.

Figure 3:
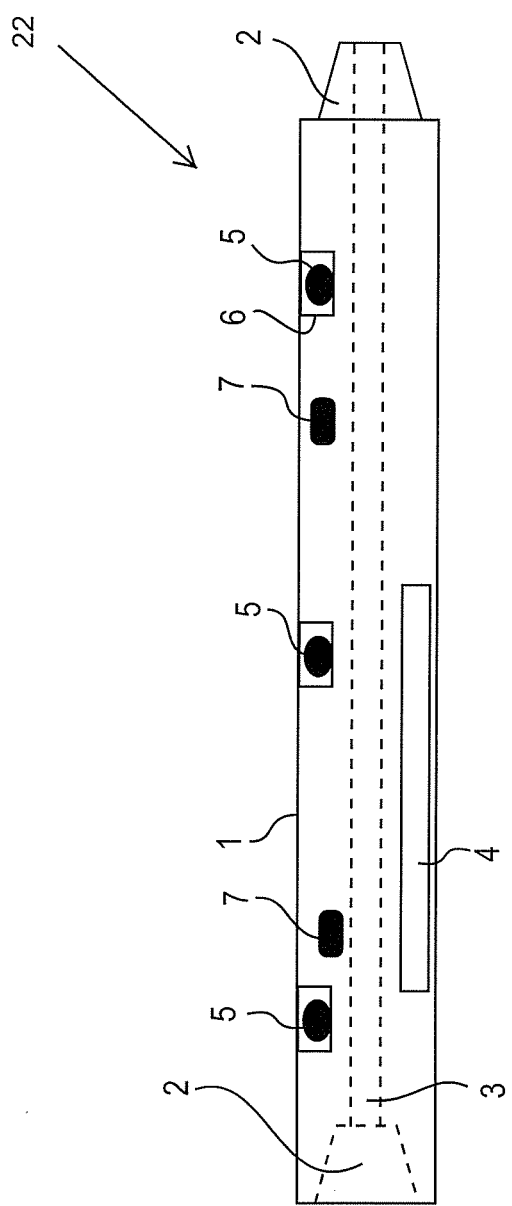
FIG. 3 is a schematic illustration of an embodiment of a receiver subsystem, which can be used with deices, systems and methods in accordance with this disclosure.

FIG. 3 is a schematic diagram of a receiver sub 22. As shown, a receiver sub 22 may contain one sensor or multiple sensors. The tubular body 1 may be terminated by conventional tapered connections 2, and includes an internal flow channel 3 enabling internal fluid to be pumped or moved across the receiver sub 22. An electronic cartridge 4 for controlling the data acquisition of the transducers and optionally for preforming some data processing is also incorporated into the tubular body 1. Seismic transducers 5, 7 are distributed over the length of the tubular 1.

The seismic transducers 5, 7 can be:
Hydrophones 5 coupled to the fluid outside the tool to detect the seismic wave travelling across the surrounding formations and in the wellbore. These hydrophones 5 may be installed in a pocket 6 for improved coupling to the external fluid and reduced coupling or de-coupling from noise 30 (refer to FIG. 5) travelling in the body 1. The hydrophones 5 can also be wrapped around the collar in a groove around the collar.
Geophones or accelerometers 7 coupled to the formation to detect the seismic waves travelling across the surrounding formations. The coupling can be implemented directly via the body 1 of the tool or may be implemented by special devices such as stabilizers and/or coupling pads. In some embodiments, 2C geophones (or 2C accelerometers) are used as the sensor 7. 2C geophones (or 2C accelerometers) are configured to detect seismic vibration in the plane perpendicular to the main axis of the tubular 1. In some applications, 3C sensors may be used.

In some embodiments such as the one depicted in FIG. 3, the transducers 5, 7 of a given type are distributed with substantially equal spacing between them, the spacing distance being determined based on a uniform length. In some embodiments, each receiver sub 22 includes 2 2C geophones (or 2C accelerometers) 7 and 3 hydrophones 5. In further embodiments, each seismic transducer 5, 7 is associated with a specific ADC convertor for data acquisition. ADC convertors may be controlled by a control unit in the electronic cartridge 4.

Figure 4:
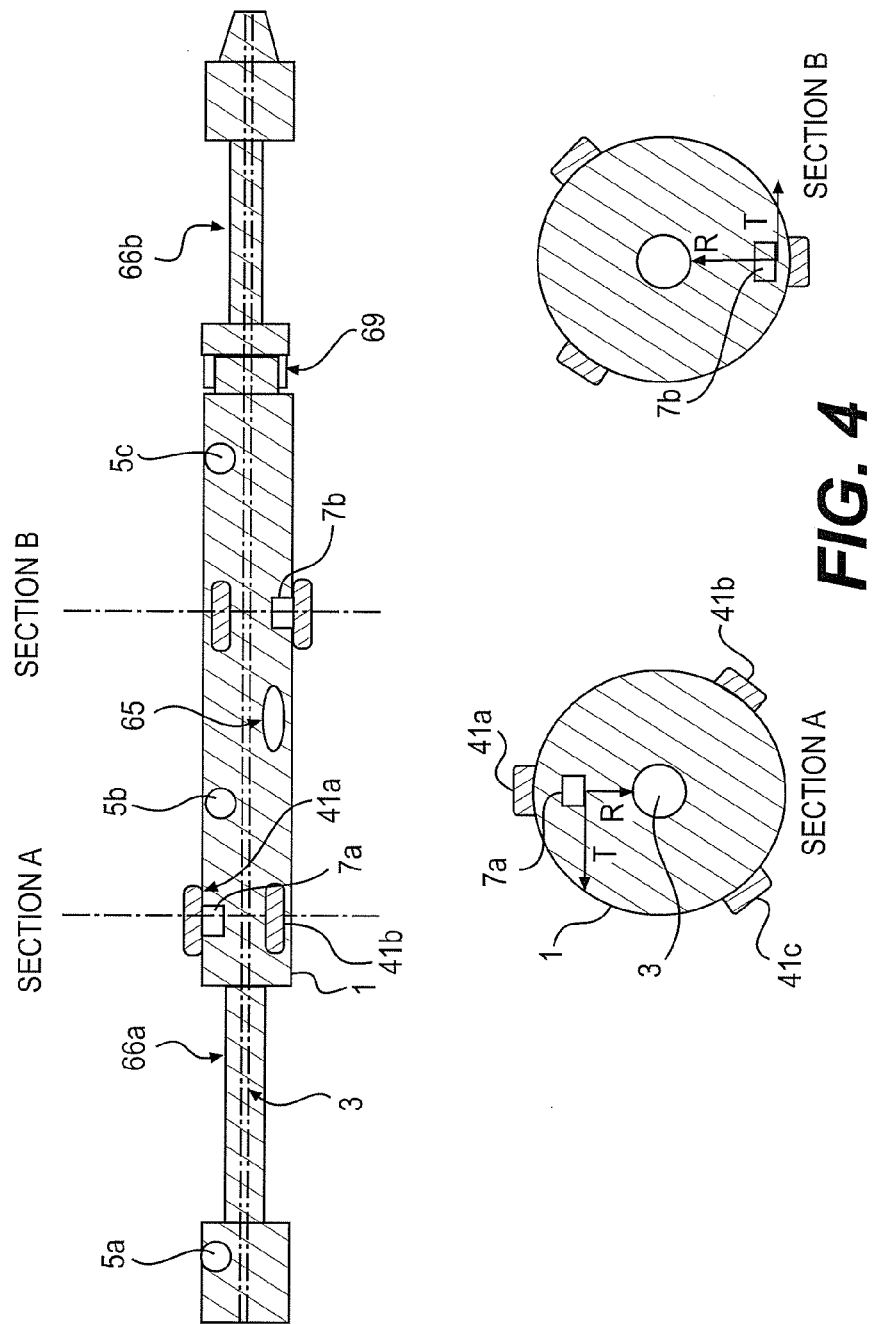
FIG. 4 is a more detailed illustration of an embodiment of a receiver subsystem, which can be used with deices, systems and methods in accordance with this disclosure.

FIG. 4 illustrates more details of embodiments of the receiver sub for low frequency downhole seismic investigation. The body 1 includes two flex joints 66a, 66b and a flow channel 3 extending over its full length. The flex joints 66a, 66b improve the contact of the central part of tubular 1 against the wellbore, when the well inclination is above a few degrees (for example more than about 4 degrees).

The central large diameter part of the body 1 includes two centralizers (stabilizers) in sections a and b (in other embodiments, however, one stabilizer could be used). Each centralizer has three straight blades 41a, 41b, 41c. The coupling stabilizers of sections "a" and "b" may be either aligned to each other or rotated by an angle typically corresponding to half the angle between the blades in one section. According to the latter stabilizer configuration, the tubular 1 may be more stable in the borehole, with no or little oscillation.

In each stabilizer section, multi-component geophones (or accelerometers) are attached to the body 1 (for example, inside the atmospheric chamber containing the electronics). As shown, the geophones (accelerometers) 7a, 7b are affixed to the tubular 1 in front of the stabilizer blades. In some embodiments, 2C geophones (accelerometers) are installed in the receiver subs: the measurement plane of these 2C geophones (accelerometers) is perpendicular to the tubular axis (with measurement axis's R, T as shown in FIG. 4).

The 2 2C geophones (accelerometers) enable "semblance processing" in 2 given tool-face planes at 90 degrees of tool-face offset. If the processing is performed for a single receiver sub, the 2 preferred tool-faces would be R and T (as the axes of sensitivity of the geophone). In each tool-face plane, the semblance processing includes data for 2 sensors (2 sensors R or 2 sensors T). This gives desired processing quality for reflector (bed boundary) detection (with proper incidence angle).

Hydrophones 5a, 5b, 5c are distributed over the length of the tool in a manner to facilitate the proper "semblance processing" between their measured data with high semblance sensitivity. In some embodiments, the configuration of hydrophones involves:
The usage of 3 sensors with maximum spacing (approximately 3 meters) in a single collar.
Reproducible coupling to the seismic signal via the wellbore fluid.
Maximum signal sensitivity as a non-directional sensor, and no loss of resolution due to the measurement axis being in alignment with geophones (accelerometers).

Referring again to FIG. 4, a section of tool is equipped with a sensor system 69 capable of detecting the direction of wave propagation in the plane of propagation; such a sensor is described in the co-pending application, filed concurrently herewith, also assigned to Schlumberger, and entitled: "Downhole Receiver Systems and Methods for Low Frequency Seismic Investigations.". A D&I system 65 is also included in the tool, allowing the determination of the tool-face and inclination of the tubular 1. This additional information enables performance of a seismic data rotation into a unique coordinate system along the whole drill-string (such as Vertical axis, North Axis and East axis), and also may improve the quality of signal processing when multiple receiver subsystems are used.

Figure 5:
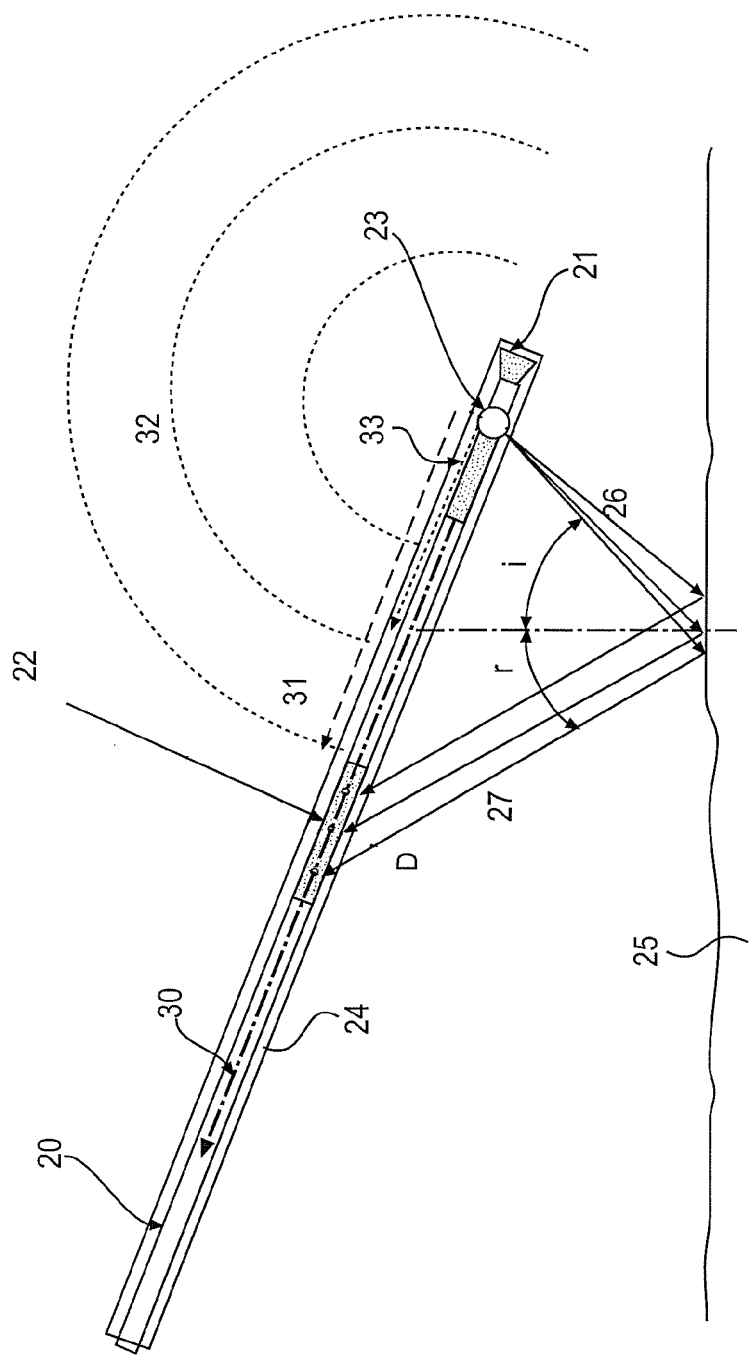
FIG. 5 is a schematic illustration of certain wave propagation patterns associated with a seismic system having a downhole seismic source.

FIG. 5 shows a drill string 20 including a downhole source 23 and a receiver subsystem 22 deployed in a wellbore. The drill string 20 is equipped with a drill-bit 21 so that drilling can be performed. As with the embodiment of FIG. 2, multiple sub-receivers may be installed in the drill string 20. MWD, LWD and RSS systems can also be installed in the BHA as described in FIG. 2. Also, the source 23 can be near the bit 21, or at the bit 21 itself, or higher in the drill-string 20 (even above some sub-receivers).

The seismic signal is typically transmitted as a spherical wave 32 expanding in the surrounding formation. The seismic signal 27 is the seismic reflection at the reflector 25 of the transmitted seismic signal 26. A formation reflector is typically the interface of two layers having different acoustic properties. The reflection direction is shown according to the typical law of acoustic propagation: the refection angle r is equal to incident angle i (the two angles are determined from the normal direction to the reflection interface). The seismic rays 31 are an equivalent representation of the seismic wave front 32; each point of the wave front corresponds to a ray which is perpendicular to the plane tangent to the wave front at that point. In particular, the ray 31 is equivalent to a ray 26, but parallel to the wellbore. This ray 31 propagates at the seismic velocity of the surrounding formation, creating a wave-front in the well-bore moving axially at the same velocity. Additional waves are also represented in the figure: wave 30 is the "steel arrival" and corresponds to the acoustic signal generated in the steel structure by the source during transmission. This signal travels in the steel of the drill-string and BHA and propagates at high velocities (slightly lower than the characteristic acoustic velocity in steel) and is submitted to limited attenuation. The wave 33 is the tube wave generated by the source 23: this corresponds to an acoustic wave travelling in the wellbore fluid at low velocity (slightly lower than the characteristic acoustic velocity of the wellbore fluid).

The "semblance processing" described is capable in most applications to separate these signals for clear recognition, as further explained herein.

Figure 6:
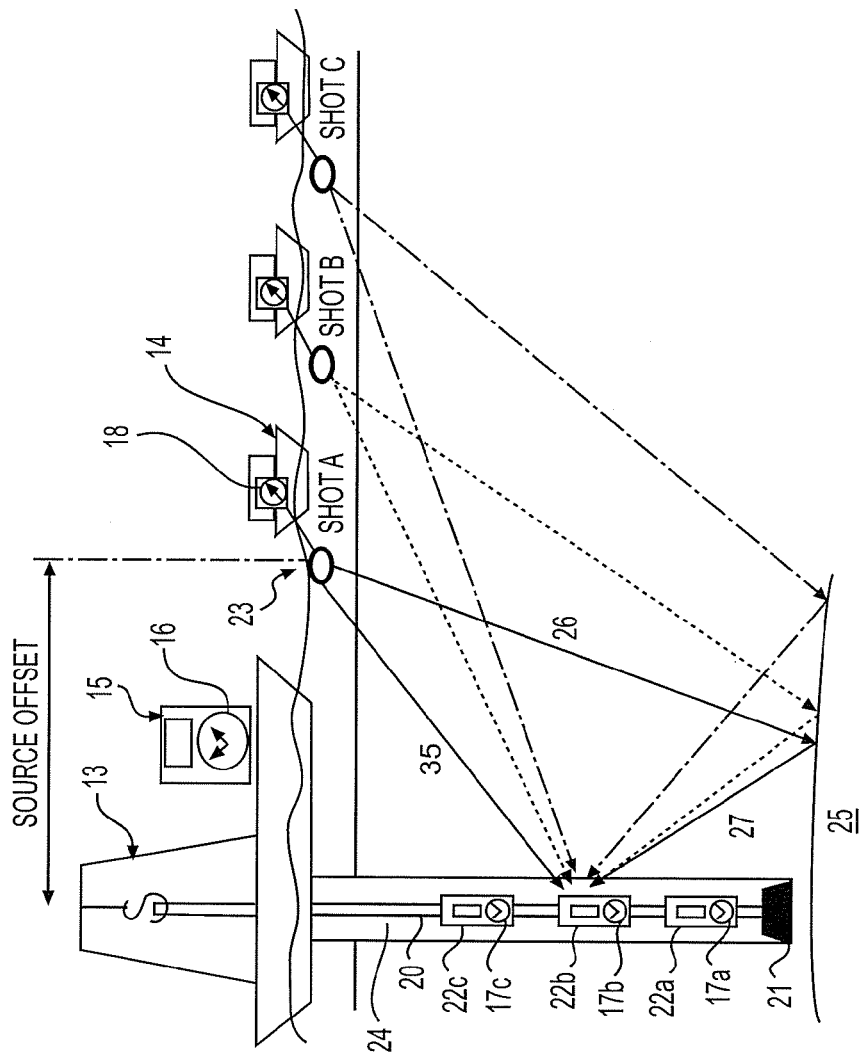
FIG. 6 is a schematic illustration of certain wave propagation patterns associated with a downhole seismic system and surface seismic sources.

In other embodiments, the seismic source is at the surface, for example. An embodiment of a surface source is shown in FIG. 6, which represents the case of a marine application, where air-guns are the source pulled by a vessel 14. This figure depicts a dow-hole seismic system where three receiver subsystems 22a, 22b, 22c are used. The drilling rig 13 is part of a floating drilling rig. The rig supports the drill-string 20, which is terminated by a drill bit 21 in the wellbore 24. Although three receiver subsystems 22a, 22b, 22c are shown, a different number of receiver subsystems may be installed in the drill string 20. Each receiver sub-system may also be equipped with synchronized clocks 17a, 17b, 17c versus a reference clock, which is commonly the clock 16 in the computer system 15 at the surface. The reference clock 16 is shown in the surface computer 15. However timing reference could also be the GPS time. The electronics controlling the source 23 also has a synchronized clock 18. Such a clock synchronization scheme may facilitate accurately relating data records for a given shot to the start time for the record.

FIG. 6 also illustrates that multiple successive shots A, B, C may be performed for a given position of the drill-string 20 in the wellbore. In some embodiments, the source 23 may be located at different positions (different source offset) for these successive shots. The ray path 26, 27 with reflection at the reflector 25 is different for these shots at different offsets. Direct arrival wave 35 may be detected and provides information to discern the relative positioning of the reflector 25 versus the receiver; the effect is used by the "semblance processing" described herein. Wellbore noise may also be present; it can include steel arrival (wave 30) travelling fast in the steel of the drill-string, and the tube wave 33 travelling slowly in the wellbore fluid. These two types of waves are perturbations over the seismic signals of interest (27 and 35); they are indirectly coupled to the source either via the sea itself or via formation. The waves 30, 33 are relatively low amplitude as the coupling is indirect to the source and the travel path is long resulting in wave attenuation. The semblance processing may ignore both waves because the arrival time is typically outside the T range of the semblance processing; the steel wave arrives too early, while the tube wave arrives too late.

In some embodiments, the downhole receiver systems are configured to gather data generated when a seismic source generating a range of low frequency signals suitable for imaging ahead of the drill bit is activated. The seismic source can be either an "impulse" type such as air-gun and dynamite or "frequency sweep" when a vibrator is used:

Air-guns are a common surface source, for example in marine and transition-zone applications;

Dynamite is generally applicable as a land surface source;

Vibrator array is common as a land surface seismic in open terrain such as desert;

Frequency sweep can also be used with a downhole source such as source made of piezo-electric crystal or a mechanic-hydraulic vibrator such as described in the co-pending application, filed concurrently herewith, also assigned to Schlumberger, and entitled: "Devices, Systems, and Methods for Low Frequency Seismic Borehole Investigations.".

Impulse seismic signal (or approximation) can be generated by downhole piezo-electric source.

In some embodiments, when a "frequency sweep" source is used, a processing may be applied on the received data to convert the data into an "impulse" type result. One example approach is to perform cross-correlation of the received data with the transmitted sweep; in practical application, the swept signal (the drive signal of the source) is used for the cross-correlation. Another example process is to perform "deconvolution" of the received data by the "transmitted data" measured in the near-field of the source.

In some embodiments, when dealing with an impulse source, a Fast Fourier Transforms (FFT) can be used to analyze the received impulse data in the frequency domain. In both cases (impulse or swept sources), the mean frequency (after FFT with impulse) characterizes the image resolution (basically the capability to separate two successive reflectors), while the overall bandwidth defines the sharpness of the image. For sensor definitions, the sensor bandwidth requirement is independent of the type of source. However, often the instantaneous signal amplitude is lower with swept source, so the sensors generally have higher sensitivity (typically about 20 dB or more).

In some embodiments, the downhole receiver systems gather data resulting from seismic sources which produce signals ranging up to about 700 Hz (when including the harmonic from the transmitted signal), or up to about 500 Hz, or from about 10 Hz to about 400 Hz, or from about 10 Hz to about 250 Hz, or from about 10 Hz to about 100 Hz, or from about 7 Hz to about 80 Hz, or from about 25 Hz to about 250 Hz.

Figure 7:
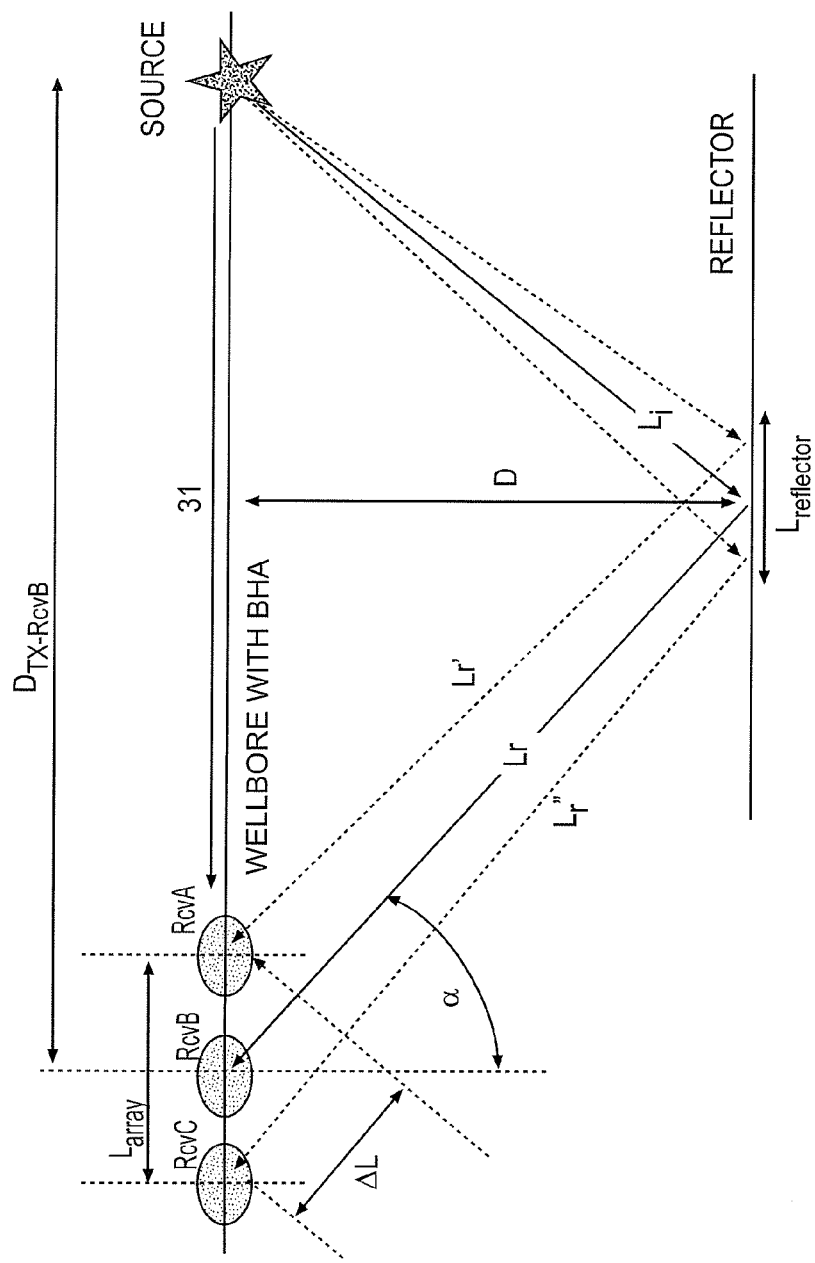
FIG. 7 is a more detailed illustration of wave propagation from a downhole source to a receiver system.

FIG. 7 illustrates an example ray pattern from a downhole source to multiple downhole receivers. In this figure, three sensors (receivers) of the same type are shown. Considering the middle sensor (RcvB), the seismic ray propagates following the path $L_i$ to the reflector, and following the path $L_r$ to the sensor in the downhole system. Similar paths are also shown for the two other sensors (RcvA and RcvC). The seismic velocity can be measured by the direct arrival wave 31, as the arrival time is then measured by the receiver system (RcvA, RcvB, RcvC) as described below.

Considering RcvB:

$$V_{formation} = D_{TX-RcvB}/T_{sw}$$

where $V_{formation}$=the seismic velocity in the formation (M/s)
$D_{TX-RcvB}$=distance between the source and RcvB (M)
$T_{sw}$=measured time for the arrival of direct wave 31 (s)
Typically:

$V_{formation}$ is in the range of about 2000 to about 5000 M/s (for P-wave in most geological formations), and $D_{TX-RcvB}$ can range from about 20 M to about 100 M and even up to about 500 M.

In one example, supposing a 100 M spacing, the measured time for wave 31 arrival would be in the range of: ~20 millisec (=100 M/5000 M/s) to ~50 millisec (=100 M/2000 M/s). For a spacing of 20 meters, the time range would be ~4 to ~10 millisec; for a spacing of 500 meters, the time range would be ~100 to ~250 millisec.

For an accuracy of seismic velocity of 5%, the timing accuracy for the seismic wave detection should be about 1 millisec (with 100 M spacing) or better, or even about 0.2 millisec with 10 M spacing. Also, the axial detection sensitivity of the sensor may likely be in the range of about 2 cm for a hydrophone and about 5 to about 10 cm with a geophone (accelerometer) coupled inside the metallic tubular. This may affect (by geometrical effect) the wave detection accuracy (when parallel to the wellbore) by about 0.2 to 1% when considering sensors in one receiver subassembly having a length of 10 meters.

Secondly, when $L_r$ is large in comparison to $L_{array}$, the incident rays ($L_r$, $L_r'$, $L_r''$) to the three receivers can be considered as parallel. The delta time for the reflected waves to reach the different receiver subs can be related as follows:

$$\Delta L = \Delta T * V_{formation} = L_{array} * \sin(\alpha)$$

so $\alpha = \arcsin(\Delta T * V_{formation}/L_{array})$
where $L_{array}$ is the distance from the first to last sensor in the array (in meters);

$\Delta L$ is the difference of seismic path length to reach the sensors; and $\Delta T$ is the time difference for the seismic ray to reach the sensor.

In one example, supposing a 10 meter spacing (2 sensors being in the same receiver subsystem), and with a fast formation ($V_{formation}$=5000 M/s), for an angle $\alpha$ of 10 degrees, $$\Delta T = L_{array} * \sin(\alpha)/V_{formation} = 10 * \sin(10)/5000 = 3.5 * 10^{-4} \text{ sec}$$

Such a time resolution may be difficult with conventional seismic equipment (sensor and ADC).

One example method to operate with such conventional equipment is to adapt the sensor spacing, for example:

If $\Delta T$=1 millisec, $\alpha$ would be about 30 degrees at the same seismic velocity at 10 M spacing;

If $\Delta T$=1 millisec, $\alpha$ would be about 5.7 degrees at the same seismic velocity at 50 M spacing. This shows the strong dependence between resolution of incident angle $\alpha$ versus seismic velocity and sensor spacing. Increasing the sensor spacing to resolve the incident angle presumes that the reflector is flat over the corresponding length of reflection coverage (shown as $L_{reflector}$ in FIG. 7). For a reflector parallel to the "straight" wellbore, $L_{reflector}$ is half the length of $L_{array}$. Also, the hypothesis of a flat wave front is only valid when $L_{array}$ is small in comparison to the total seismic travel path ($L_t + L_r$). This may be acceptable when $L_{array} < (L_t + L_r)/20$.

As an example:

if $L_{array}$ is 10 meters, and $D_{TX-RcvB}$ is 100 meters→D=85 meters if $L_{array}$ is 10 meters, and $D_{TX-RcvB}$ is 20 meters→D=97 meters For a shorter distance D to the reflector, the conventional NMO (Normal-Move-Out process for seismic) formula should be used to determine arrival time versus true offset distance between the sensor and the source.

In some embodiments, the network of subsystems further include an electronics subsystem having data processing capabilities for determining the distance and/or orientation of at least a portion of the reflectors (bed boundaries) near the seismic system.

In some embodiments, the receiver systems further include a data management subsystem allowing some optional local data processing, optional downhole data storage and organizing proper transfer (telemetry) to other downhole equipment and even to surface via optional telemetry repeater. The data transfer (telemetry) can be performed via wired-drill-pipe as telemetry for transferring collected data to the surface. In other applications, the data transfer from the receiver system is transferred to a downhole processing unit which can perform more data reduction and organize the data transfer to surface via MWD conventional telemetry. For example, the data reduction subsystem may identify a subset of reflectors and only data relating to that subset of reflectors is transmitted to the surface. In some embodiments, the methods further include a data reduction step, for example to reduce the volume of data prior to transmission to the surface, such as a semblance analysis step, which compares seismic data between adjacent receivers inside a small shifted time window along the recorded data and may detect the signal for the corresponding reflectors, even in the case of a signal arriving at various incident angles onto the receiver subsystem.

The methods according to this disclosure are based on semblance processing of seismic data, such as data acquired by the receiver system described above, and more fully described below. In some embodiments, the following elements define the semblance mapping and associated data acquisition processes according to this disclosure:

Maximum Time T for Semblance Processing of a Reflector with Multiple Sub-Receivers: 500 Millisec.

According to some embodiments, the network of receiver subsystems are configured to gather data, which facilitate determining the distance and orientation of bed boundaries, including ahead of the drill bit. In some embodiments, the network of subsystems are configured to facilitate viewing up to about 200 m, or up to about 300 m, or up to about 400 m, or up to about 500 m away from the wellbore in which the seismic receiver system is installed. This maximum distance for imaging defines the maximum value of the time scale in the "semblance processing." The maximum time corresponds to a "slow formation" in which the seismic velocity may be as low as about 2000 meter/sec corresponding to the a maximum time T for semblance processing in the range of about 500 msec (500 m*2/2000 m/s).

Maximum Time T for Semblance Processing of Seismic Velocity Inside One Sub-Receiver: 5 Millisec.

The maximum value of the other scale for semblance processing (the delta-time $\Delta T$) is defined by a slow wave travelling parallel to the wellbore. Some of the slowest waves are tube waves travelling in the wellbore fluid (down to approximately about 1000 M/s). Also, the largest ΔT would correspond to long spacing between sensors (when installed in different receiver subsystems), which spacing may be up to about 100 meters corresponding to a semblance processing for ΔT up to about 100 msec. When semblance processing is performed between sensors included in the same receiver subsystem, the spacing can be in the range of about 5 meters, changing the requirement for the maximum value of ΔT to about 5 msec.

Required Upper Frequencies of Received Signal: 250 Hz or Higher.

To achieve reflector separation when separated by 10 meters, the receivers system should be able to detect seismic signal at and above about 250 Hz. This estimation is based on a criterion that the separation is feasible when the reflectors are at a minimum separation of a quarter of a wavelength. This criterion defines the upper frequency of the band-pass filter for seismic signal. In some embodiments, the upper frequency is about 500 Hz.

Required Sampling Rate (or Time Resolution): At Least 1000 Samples/Sec and in Some Embodiments 10,000 Samples/Sec.

The resolution of time measurement is primarily defined by the overall spatial accuracy for the location of reflector. This accuracy depends primarily on the time accuracy for the reflector detection as well as the accuracy for seismic velocity determination. The seismic velocity is measured via the detection of the wave 31 propagating along the wellbore. This seismic velocity is determined with high accuracy (e.g., better than about 5%) for seismic velocity up to about 5000 M/s. When only one receiver subsystem is used, the sensor spacing is typically less than 10 meters, the detection may be performed with an accuracy better than about 0.15 msec: the signal digitalization should be performed with about 10,000 samples/sec, making the ADC (analog-to-digital convertor) quite difficult to design and operate at large amplitude resolution (up to about 24 bits) and at high temperature (about 150 degrees Celsius or higher). When at least 2 receiver subsystems are used, the sensor spacing is then larger, as it becomes the sum of the sensor spacing 222a, 222b, 222c and distance 223a, 223b between consecutive receiver subsystems (see FIG. 2). The spacing can reach nearly 50 meters (with 4 tubular between receiver subsystems). Then, the sampling rate can be reduced to approximately 2000 samples/sec, which is more appropriate with conventional seismic hardware (sensor, ADC, clock . . . ). The sampling rate could even be lowered to about 1000 samples/sec if the sensor spacing is increased to about 100 meters.

Minimum Clock Accuracy (Including Synchronization): 50 Microsec in One Sub/200 Microsec Between Subs.

The clock accuracy for driving the ADC may be better than about 50 microsec between the multiple seismic channels in the same receiver subsystem. The clock accuracy between multiple receiver subsystems may be better than about 200 microsec to insure possible processing including data sampled at 1000 samples/sec between different receiver subsystems.

Figure 8:
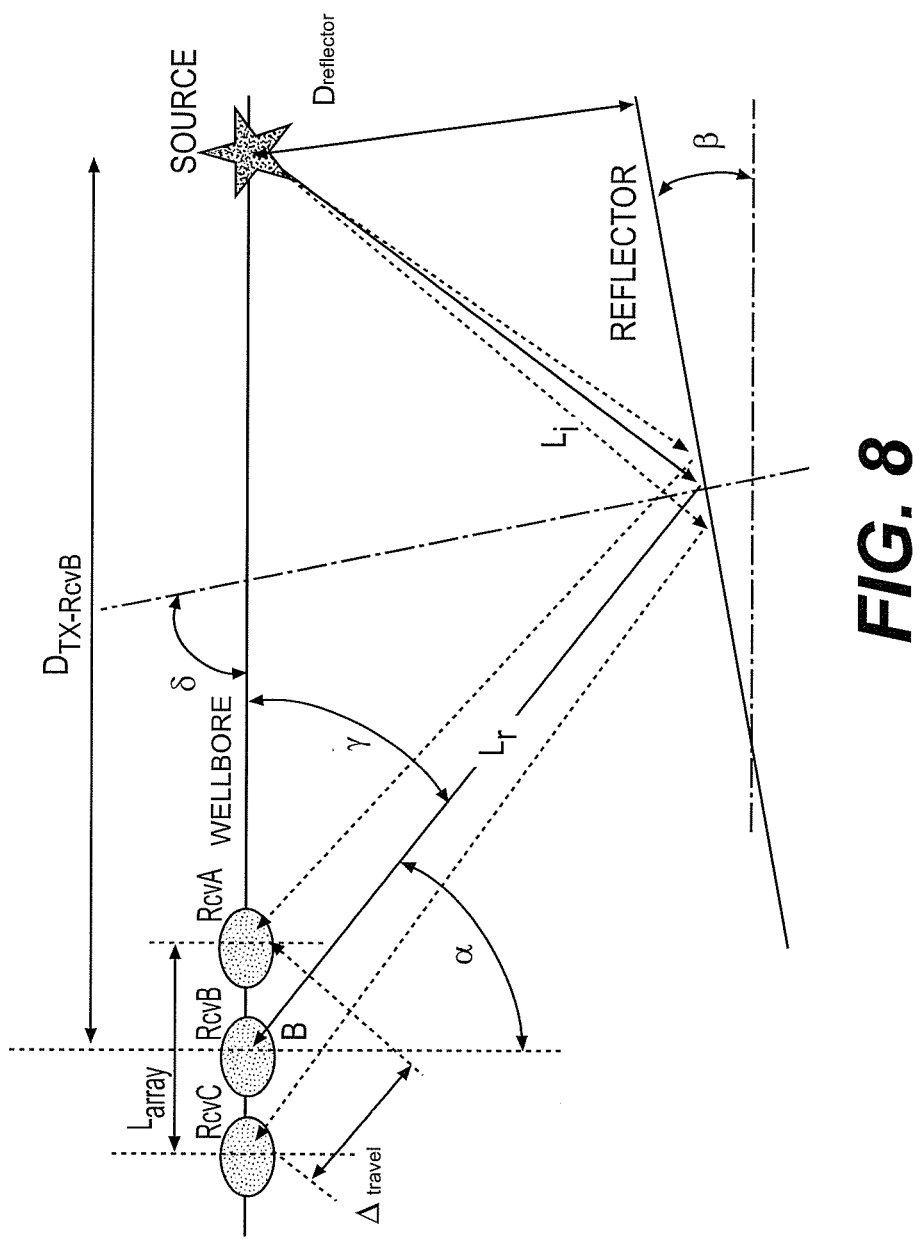
FIG. 8 is another more detailed illustration of wave propagation, showing certain patterns from a downhole source to a receiver system when a reflector is inclined versus a borehole axis.

Turning now to FIG. 8, the seismic receivers, which are installed in the well, detect the seismic wave front for either direct arrival 31 or for a reflected wave arriving by the paths $L_r$, $L_r'$, $L_r''$ with time delay. In such case, the "semblance processing" can be applied via a modified methodology, in reference to the application for a sonic tool. "Semblance processing for a seismic application" is illustrated with an example shown in FIG. 8. In this example:

Three sensors are placed in the drill-string as RcvA, RcvB, RcvC.

The seismic source is also installed in the drill string.

The reflector is inclined versus the wellbore.

The geometry of the system is described as follows:

$D_{TX-RcvB}$=distance between the source to the center of the receiver system: in this case, it is also the center sensor.

$L_{array}$=distance of the receiver group=distance between the two most distant sensors in the group;

$D_{reflector}$=distance from the source to the reflector: this distance is measured following the line perpendicular to the reflector passing by the source: this is the shortest length from the source to the reflector plane;

Angle β=inclination of the reflector versus a line parallel to the wellbore;

Angle δ=dip angle of the reflector versus the wellbore;

Angle α=incident angle of the received signal onto the receiver group;

Angle γ=angle of receiver group (or the axis of the wellbore near the sensors) and the incident seismic ray onto the group;

$\Delta_{travel}$=additional length to travel to reach the farthest sensor in comparison to the closest sensor (with reference to the source);

$L_i$ is the length of the incident ray from the source to the reflector which reflects and passes by sensor B;

$L_r$ is the length of the reflected ray which passes by the sensor B.

It is supposed that $(L_i+>>L_{array})$, so the rays arriving at the three sensors can be considered parallel to each other and the wave front is considered to be flat (planar).

With respect to this geometry, two types of seismic signals from the source can reach the sensors A, B, C (FIG. 9A), the formation direct arrival 31 travelling in the wellbore at formation acoustic velocity (around 3000 M/s), and the reflected signal 27 reaching the sensors after reflection at the reflector (from the incident ray 26). This seismic wave also travels at formation acoustic velocity. FIG. 9B represents the signal output of the sensors, supposing that the source generates an impulse as a signal. In FIG. 9B, the vertical axis is the time of recording after the "firing" of the source; the horizontal axis is the amplitude of the sensor output. The three sensors are displayed with a horizontal shift (corresponding to the offset to the source) as is commonly done in seismic recording and imaging processes.

Still referring to FIG. 9B, at time T31, the "formation direct arrival" signal reaches the closest sensor (RcvA). The sensor output shows the detected signal. Before and after that signal, the sensor output contains mainly "noise." Later, at time T27, the RcvA sensor detects the reflected signal 27.

Semblance processing looks for consistent signals related to same seismic event (signals) across the multiple sensors. The processing method includes sliding an observation time window of a given width W. This window slides following the time axis: for each position T of the sliding window, multiple "inclinations" are considered in the data records of all receivers. The inclination is characterized by delta-time ΔT. For the position of the sliding window characterized by T and ΔT and W, cross-correlation is performed between the traces. The cross-correlation factor defines the quality of the match.

Figure 9:
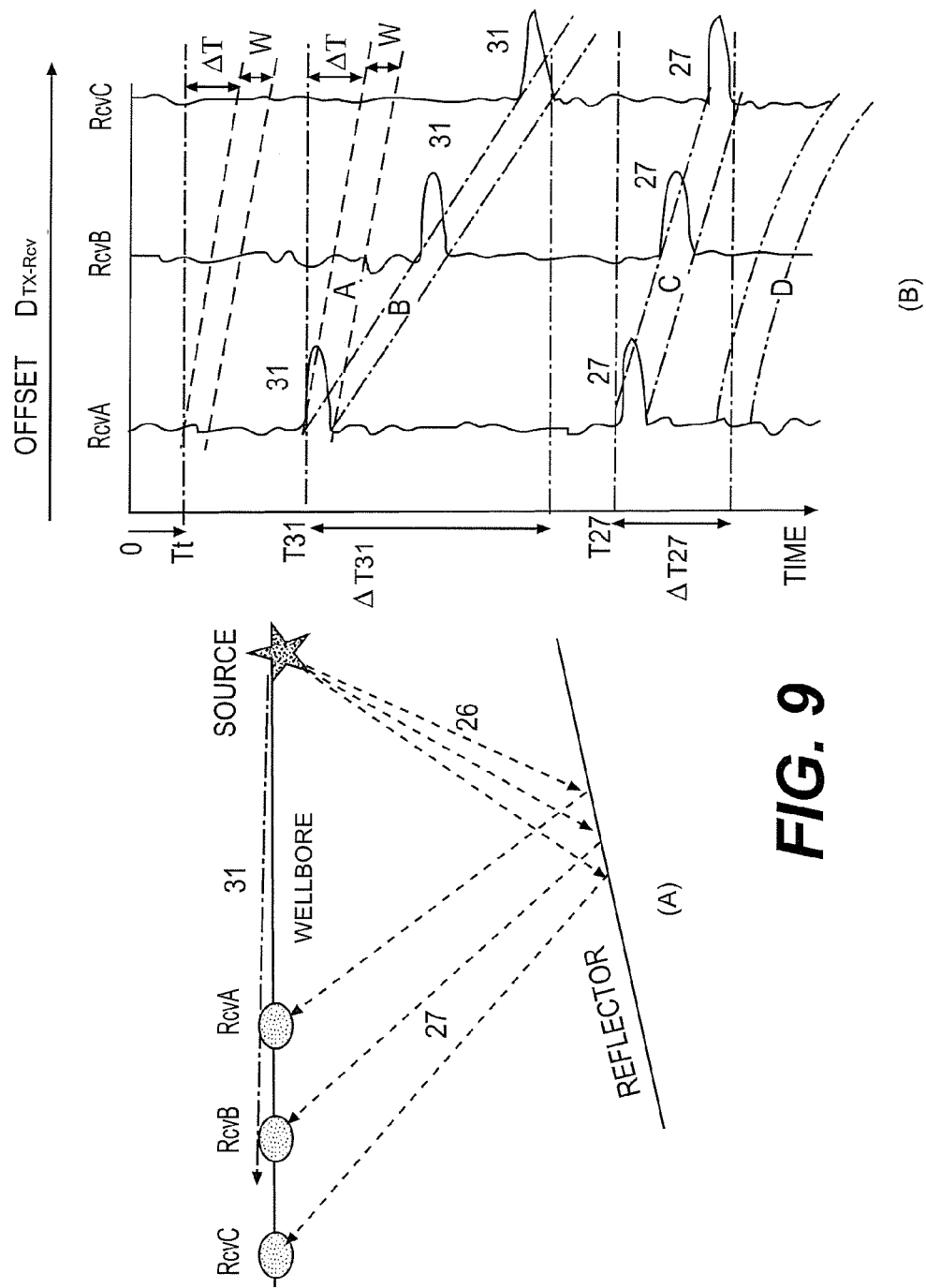
FIG. 9 is an illustration relating to signal detected from certain wave propagation patterns from a downhole source to a receiver system, when a reflector is inclined versus a borehole axis, in a semblance graph.

Looking in the example of FIG. 9:

When the sliding window is at position Tt, the "data" for each sensor is only noise: this means that the correlation will be of low value for all possible window inclinations.

When the sliding window is at position T31, a seismic signal 31 is contained in the window on RcvA. When considering the sliding window A (low $\Delta T$), the other sensors do not receive signal and the correlation between signals of the 3 sensors in the window W (semblance) is low. For the sliding window B, the $\Delta T$ is optimum so that the window includes the seismic signal 31 for all sensors. So the correlation factor is high.

Window at T31 with a larger inclination $\Delta T$ would again have low semblance as no seismic signal would be included in RcvB and RcvC The semblance coefficient (correlation factor) should be zero outside the proper window B and one for the optimum location of the window B across the received signal for all sensors. There is often a smooth transition of semblance from 0 to 1.

Still in the example of FIG. 9, the second seismic signal 27 arrives on the three sensors in the window C characterized by the time T27 and $\Delta T27$.

Figure 10:
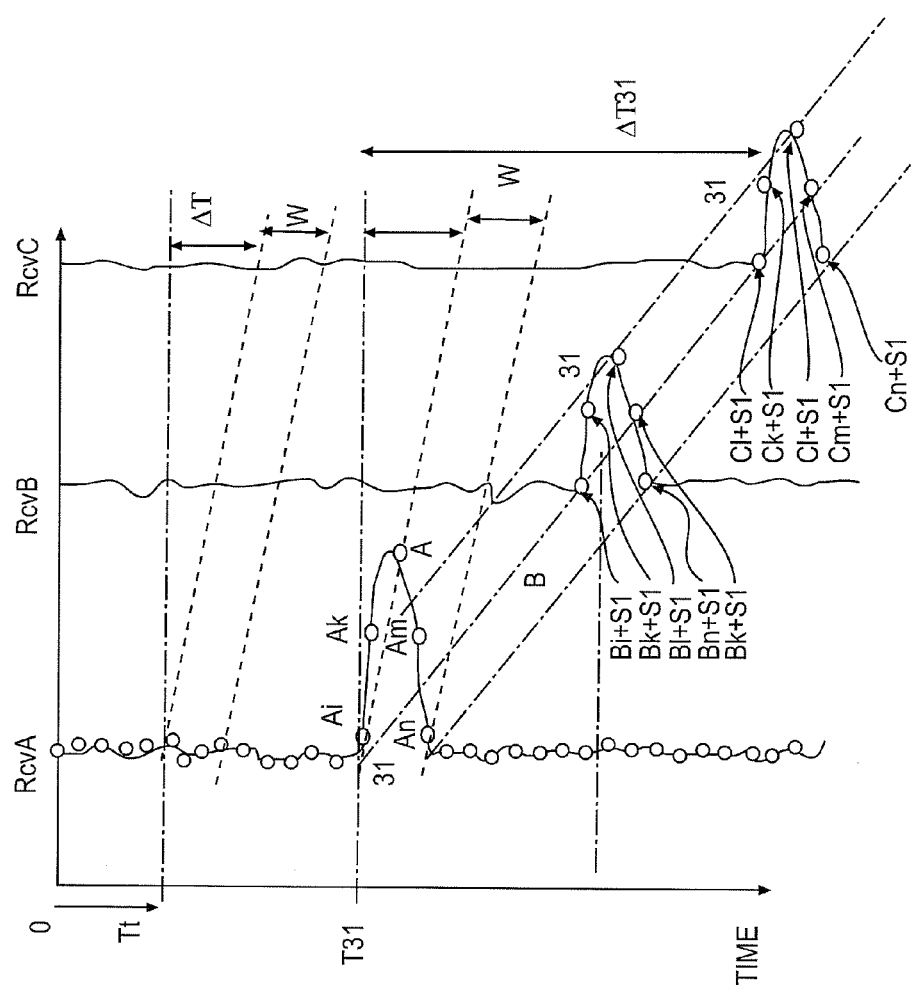
FIG. 10 is a more detailed illustration (in relation to FIG. 8) of signals detected by sensors, along with a description of semblance processing in accordance with the present disclosure.

FIG. 10 shows a more detailed view of the window corresponding to the arrival of the seismic signal 31. After ADC, the signals are digitized at a desired sampling rate (such as 1000 samples/sec). These samples are represented by the dots in FIG. 10 for the sensor RcvA; however, this same representation would apply for all sensors (although not shown for RcvB and RcvC).

When the geometrical spacing of the sensors is uniform, it is convenient to characterize the window inclination by a "multiple" N of samples→$\Delta T = N$/sampling rate.

The semblance coefficient is an estimator of the similarity between the signals for the N sensors inside the window W. A potential estimator of "semblance" coefficient is:

$$S = 1 - \frac{\text{square root}\left(\sum_{i=J \text{ to } N}\left\{\begin{array}{c}(A_i - B_{i+s1})^2 + (B_{i+s1} - C_{i+s2})^2 + \\ (C_{i+s2} - A_i)^2\end{array}\right\}/(N-J)\right)}{\text{square root}\left(\sum_{i=J \text{ to } N}(A_i^2 + B_{i+s1}^2 + C_{i+s2}^2)/(N-J)\right)}$$

with:
$A_i$ the sample I of RcvA;
$B_{i+s1}$ the sample i+s1 of RcvB;
$C_{i+s2}$ the sample i+s2 of RcvC;
s1 "shift" between RcvA and RcvB in number of samples;
s2 "shift" between RcvB and RcvC in number of samples;
J is the lowest index of the sample in the window W; and
N is the highest index of the sample in the window W.
In case of uniform spacing between Rcv's, $$s1 = s2 \text{ and } (s1+s2)*ST = \Delta T$$

where:
$\Delta T$ is the total time shift for the window as shown in FIG. 10; and
ST is the time interval between samples at ADC.

As defined, the semblance coefficient corresponds to three sensors. However, it can be generalized for K sensors as follows:

$$S = 1 - \frac{\text{square root}\left(\sum_{i=J \text{ to } N}\left\{\begin{array}{c}(A_i - B_{i+s1})^2 + \ldots + (J_{i+sj} - K_{i+sk})^2 + \\ (K_{i+sk} - A_i)^2\end{array}\right\}/(N-J)\right)}{\text{square root}\left(\sum_{i=J \text{ to } N}(A_i^2 + B_{i+s1}^2 + \ldots + K_{i+sk}^2)/(N-J)\right)}$$

The semblance coefficient as defined above can be sensitive to signal reversal. That is, if a signal is compared to its mirrored signal (reversed signed), each term in the numerator will not be null but twice the value making the semblance very low. In a sonic tool, signal reversal is not an issue. However, in a seismic application, the reflected signal can have a "negative sign" depending on the contrast of acoustic impedance at the reflector. In some embodiments, to avoid error in recognition of a reflected signal, the semblance formula may be calculated twice (with minus and then plus). The highest value of the coefficient is then retained as answer:

$$S += 1 - \frac{\text{square root}\left(\sum_{i=J \text{ to } N}\left\{\begin{array}{c}(A_i - B_{i+s1})^2 + \ldots + (J_{i+sj} - K_{i+sk})^2 + \\ (K_{i+sk} - A_i)^2\end{array}\right\}/(N-J)\right)}{\text{square root}\left(\sum_{i=J \text{ to } N}(A_i^2 + B_{i+s1}^2 + \ldots + K_{i+sk}^2)/(N-J)\right)}$$

$$S -= 1 - \frac{\text{square root}\left(\sum_{i=J \text{ to } N}\left\{\begin{array}{c}(A_i + B_{i+s1})^2 + \ldots + (J_{i+sj} + K_{i+sk})^2 + \\ (K_{i+sk} + A_i)^2\end{array}\right\}/(N-J)\right)}{\text{square root}\left(\sum_{i=J \text{ to } N}(A_i^2 + B_{i+s1}^2 + \ldots + K_{i+sk}^2)/(N-J)\right)}$$

S=max of (S+ and S−); in either case, S is positive.

A flag may be associated with the semblance coefficient to "memorize" if the signal had to be reversed for max semblance. This information is about the negative reflection factor corresponding to negative contrast of impedance. Indeed after semblance processing, the reflector is located, but without the associated flag to the reflector, the information related to contrast of impedance would be lost: this sign indicates if the "lower" rock is "lighter and slower" or opposite, allowing to estimate either the type rock or succession of the change of fluid in the pore (such as presence of gas making the rock "lighter and slower").

The semblance coefficient can be adapted to include the effect of "overall" amplitude variation between sensors. This variation may be due to:
Signal attenuation during the travel;
Sensor coupling sensitivity (especially for geophone and accelerometer); and
Sensor and electronic sensitivity variation.

In some embodiments, the measurements made by each sensor in the time window can first be normalized versus the RMS value of the signal. For example, in the time window W, the RMS value is computed per sensor:
For sensor B, $$RMS_{Bk} = \text{square root}\{\Sigma_{i=J \text{ to } N}(B_{i+s1}^2)/(N-J)\}.$$

Also, the overall RMS signal in the time window for all sensors is computed $$RMSk = 1/N * \text{square root}\{\Sigma_{i=J \text{ to } k} RMS_{ik}^2\},$$

where k is the index of the seismic arrival.
Next the amplitude of each sample in the time window for each sensor is corrected as follows:
For sensor B $$B_{i+s1} = B_{i+s1} * RMS_B/RMSk \text{ (these are the "corrected signals")}.$$

Finally, the "corrected semblance coefficient" is computed as explained above, but the "corrected signals" are used in place of the basic signals. RMSk for the window of best semblance characterizes the amplitude of reflected signal k: enabling characterization of the importance of the reflector.

Figure 11:
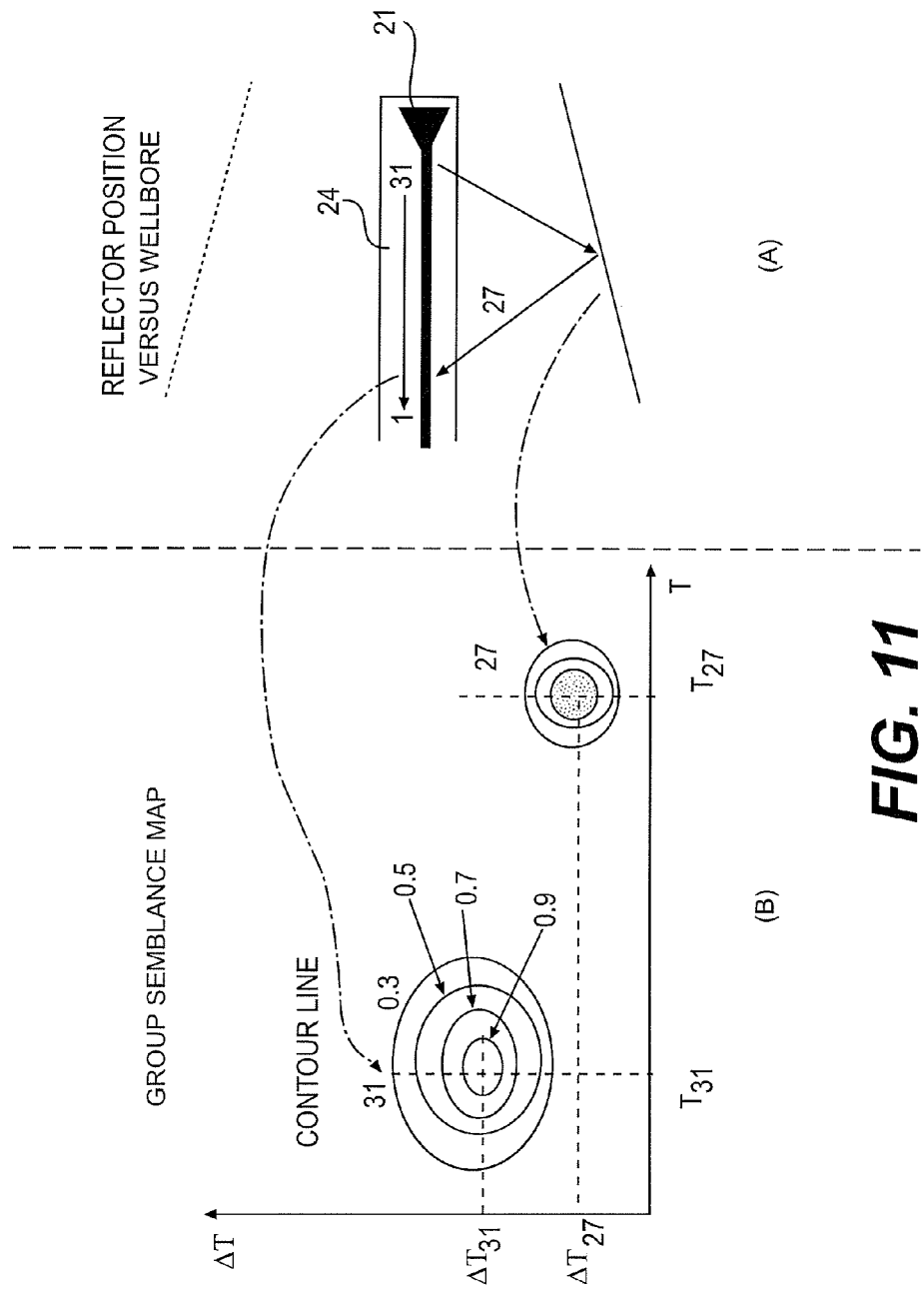
FIG. 11 is an illustration of an example of semblance map versus reflector positions.

Semblance coefficient values (or corrected semblance coefficient values) are mapped as contour lines of constant value in a "2-dimensional" space (arrival time T & shifted time ($\Delta T$)). For the example as shown in FIG. 11, the semblance map would indicate zero everywhere, except for two peaks of 1 corresponding to the arrival of signal 31 (formation direct arrival) and 27 (reflection).

In reference to this figure, FIG. 11A shows the geometry previously described in FIG. 5: with respect to the BHA (with bit 21) positioned in the wellbore 24. FIG. 11B is the semblance map (T, $\Delta T$) with lines of constant semblance values (the contour lines) as follows:

The direct arrival via the formation is described by the contour line. The time $T_{31}$ is relatively small (in comparison to $T_{27}$), as the travel path from the source to the sensor is direct (parallel to the wellbore). The $\Delta T_{31}$ is more important as the wave travels parallel to the sensor array.

The reflected signal 27 is characterized by a small $\Delta T_{27}$, which is at a minimum when the reflector is parallel to the wellbore. However, $T_{27}$ can be large if the reflector is distant from the wellbore.

Figure 12:
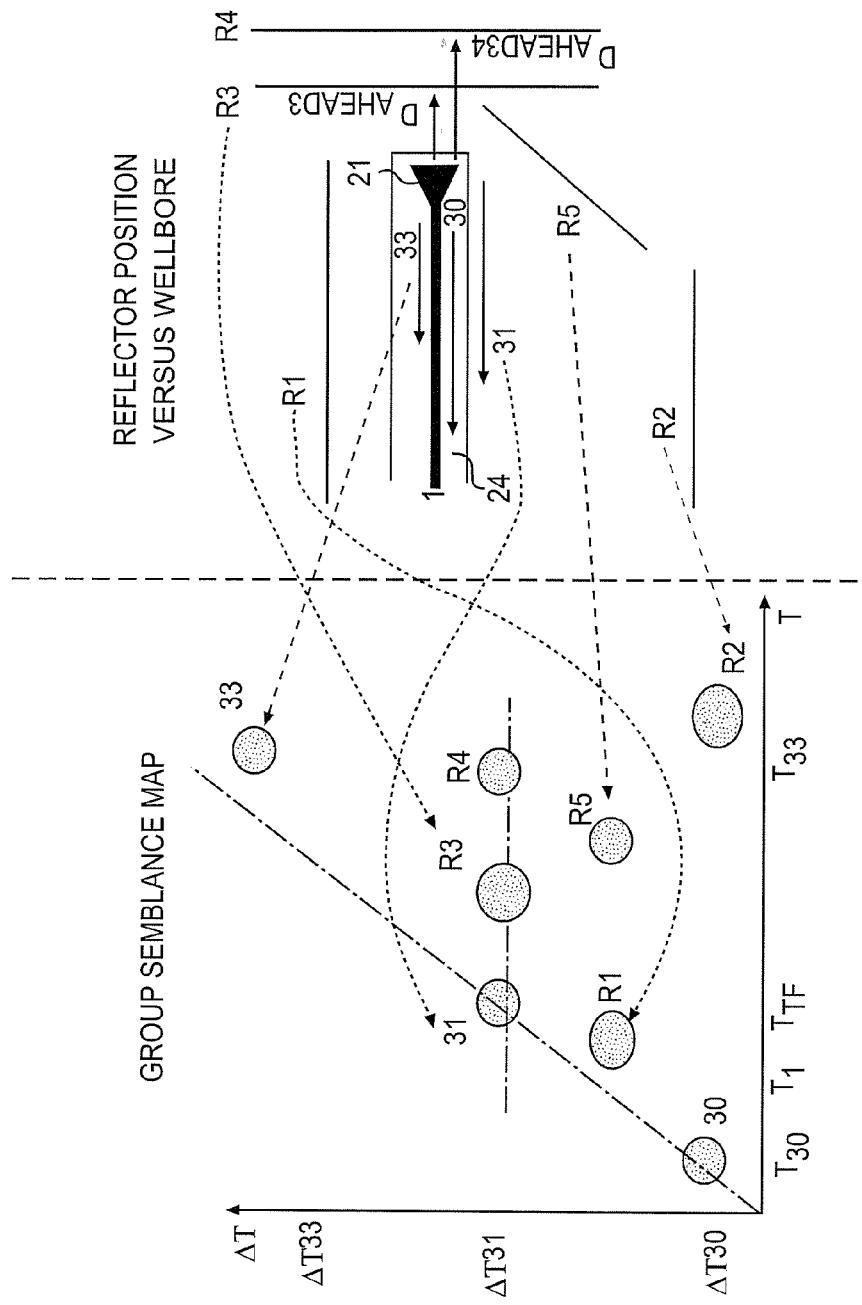
FIG. 12 is an illustration of another example of semblance map versus reflector positions.

FIG. 12 describes a situation with multiple reflectors. This figure shows the correspondence between the geometry (reflector position) and the semblance map. The reflectors (R1, R2, . . . R5) around the wellbore 24 surrounded by formation (with tubular 1 and bit 21) are indicated in the semblance map; also the signals (30, 31, 33 of FIG. 5) propagating "parallel" to the wellbore are included in the map. In this map, only one circle represents the set of contour lines for a given peak of semblance (in order to render the illustration clearer). The dependence between reflector positions around/ahead the wellbore and the peak of the contour line position on the map can be observed as follows:

The "steel wave" 30 propagates fast (nearly at 6000 M/s) in the tubular structure. It arrives first at the group of sensors.

The "tube wave" 33 propagates slowly (speed is in the range of about 1000 to about 15000 M/s) in the wellbore fluid. It arrives late at the group of sensors.

The formation arrival 31 propagates in the formation at the wellbore wall at the seismic velocity of the formation. This velocity is in the range of about 2000 to about 5000 M/s.

Reflectors R1 and R2 are parallel to the wellbore. The $\Delta T$ depends on the distance between the wellbore and the reflector (refer to FIG. 7).

For a large distance reflector (such as R2), $\Delta T$ is small.

If distance is half the source-to-group spacing, the angle $\alpha$ is 45 degrees and DT is 0.7 of the $\Delta T$ for wave 31. An example is given by reflector R2.

Inclined reflectors (such as R5) can be in a wide range of $\Delta T$ in the semblance map, as the dip angle of the reflector creates a large incident angle $\alpha$.

Reflectors R3 and R4 are ahead of the bit and perpendicular to the wellbore. The transmitted signal initially travels forward towards these reflectors and is reflected and travels parallel (along) to the wellbore. The propagation velocity along the wellbore is equal to the seismic velocity in the formation. This means that the transmitted signal will be detected by the array of sensors at the same $\Delta T$ as the wave 31 which is used to determine seismic velocity in the formation. Accordingly, R3 and R4 are on the same $\Delta T$ in the semblance map as wave 31.

Typical values for parameters (T, $\Delta T$, W) used to define "semblance" processing are described as follows:

T covers a range from 0 to the end of the seismic record: this could be 1, 3 or 6 sec depending on the position of the source versus the receivers, as well as the distance from the wellbore to the reflector with a downhole source.

The window length W for the computation of the semblance coefficient may be slightly wider than the characteristic reflected signal (or correlation wavelet); for example, 2 or 5 typical seismic cycles (or mid frequency signal). As an example, if 100 Hz is the mid frequency of the signal, the correlation window may be about 20 to 50 millisec.

The shifted time ($\Delta T$) depends mainly on the delay for the same wave front to reach the multiple receivers; this delay depends on the propagation velocity and the incidence angle. In embodiments where signal is detected at perpendicular incidence, the range for $\Delta T$ can extend from zero to about 2 to 10 millisec when the distance between adjacent receivers is less than 10 meters for seismic velocity in the range of about 1000 M/s (such as tube wave propagating in wellbore) to fast signal (e.g., 5000 M/s) propagating parallel to the wellbore. This $\Delta T$ range would typically work for one receiver subsystem of about 10 meters. If the group extends over several receiver subsystems (as shown in FIG. 2), the upper range for $\Delta T$ may be increased in accordance to the total length of the group (used of semblance processing). With about 50 meters group length (as example), the $\Delta T$ upper value could be about 50 millisec.

As explained previously, "semblance processing" can be used to detect signals even in poor signal-to-noise conditions. The processing is performed in a group of sensors, by comparing the sensor outputs of the same type (hydrophone or geophone or accelerometer). With sensors sensitive to propagation direction (such as accelerometers and geophones), the processing is performed over the same toolface: coordinate rotation for such sensor is typically performed.

When working within a single seismic receiver subsystem, the sensors are properly oriented between multiple tool sections (by sub design and construction). If a group includes several receiver subsystems, then coordinate rotation of the geophone/accelerometer data into 2 reference "radial" planes can be performed before any processing.

A group may extend to 2 or 3 receiver subsystems (as shown in FIG. 2). In some embodiments, subsystems may be a tubular (collar) of about 10 meters, and the group may extend to a length of about 50 meters. In some embodiments, a group could be made of 2 receiver subsystems (each of about 10 meters) spaced by one to three extra tubulars making a spacing of about 10 to about 30 meters, so that the total length of the groups would vary from about 30 to about 50 meters. In some embodiments, the total length of the groups may be as small as about 20 meters.

When semblance processing is applied inside one receiver subsystem, in some embodiments, the physical spacing between adjacent sensors is constant for all sensors (by design of the sub). With this hardware configuration, the acoustic signal travelling parallel to the wellbore arrives at adjacent sensors with a delta time $\Delta T$ which is also constant for all pairs of adjacent sensors. This means that the sliding (delta) window has straight edges, as shown in the FIG. 9 for the wave 31 (steel arrival). However with the groups of sensors as defined above, the geometrical spacing between sensors may not be a unique value. In some embodiments, for example 2 subsystems spaced by about 20 meters, the sensor spacing within a subsystem may be in range of either about 4 meters (if 3 sensors are axially laid along the collar) or about 8 meters (if only 2 sensors are axially laid along the collar). Then the next spacing may be in the range of about 22 meters (2*10 meters+2*1 meters), and finally again about 4 or about 8 meters. As a consequence, ΔT should be normalized according to the geometrical spacing.

As semblance processing is about time shifting for comparison, the basic time shifting (delta) ΔT corresponds to the time shift between adjacent sensors in a receiver subsystem. The sensor spacing can be defined in the subsystem as S (spacing between sensors in one subsystem).

Then, considering Sij as the spacing between the closest sensors in adjacent subs i and j; ΔTij is the corresponding time shift for the closest sensors in adjacent subs i and j. The spacing between these adjacent sensors would be Sij.

For a given sampling rate, the Δt between samples=1/sample rate. So:

$$\Delta T = N * \Delta t$$

where N is the number of samples between adjacent sensors to skip for the semblance processing, $$\Delta Tij = Mij * \Delta t$$

where Mij is the number of samples between closest sensors in the sub-receivers i and j to skip for the semblance processing, and $$Mij = N * Sij / S.$$

The semblance processing can then be performed when using these non-uniform sample shifts between adjacent sensors.

When the receiver system and source are in the vicinity of the reflector and also the spacing between receivers and source is limited, a wave front reaching the sensor of one sensor group may not be "flat". In this situation, the sliding window may not be "straight" as shown in FIGS. 9 and 10 with windows A and B. In some embodiments, the correct "move-out" definition with a curved window D is used (see FIG. 9). In reference to FIG. 8:

$$L_i + L_r = \frac{D_{Tx\text{-}RcvN} * \cos(\beta)}{\sin\left(\arctan\left\{\frac{D_{Tx\text{-}RcvN} * \cos(\beta)}{(2 * D_{reflector} + D_{Tx\text{-}RcvN} * \sin(\beta))}\right\}\right)}$$

where $D_{Tx\text{-}RcvN}$ corresponds to the offset (distance) from the source to the specific sensor N (refer to FIG. 8).

$L_i + L_r$ is the length of the path for the wave to travel from the source to the reflector and then to the sensor N.

This formula can be called "normal move-out for inclined reflector" given in space.

The formula can be adapted to give the "normal move-out for inclined reflector" in time domain (by dividing the previous formula by the seismic velocity in the formation):

$$T_i + T_r = \frac{T_{31} * \cos(\beta)}{\sin\left(\arctan\left\{\frac{D_{Tx\text{-}RcvN} * \cos(\beta)}{(2 * D_{reflector} + D_{Tx\text{-}RcvN} * \sin(\beta))}\right\}\right)}$$

where $T_i + T_r$ is the time for the wave to travel from the source to the reflector and then to the sensor N.

To determine the proper time window versus sensor offset $D_{Tx\text{-}RcvN}$, the seismic velocity $V_{formation}$ is used to calculate ΔT:

$$\Delta T = (L_i + L_r) / V_{formation}.$$

Accordingly, semblance processing for the determination of $V_{formation}$ can be initially performed.

Also, the incident angle α can be written as a function of ($D_{Tx\text{-}RcvN}$ and $D_{reflector}$), where the function is:

$$\alpha = \beta + \arctan\left(\frac{D_{Tx\text{-}RevN} * \cos(\beta)}{2 * D_{reflector} + D_{Tx\text{-}RevN} * \sin(\beta)}\right)$$

Figure 13:
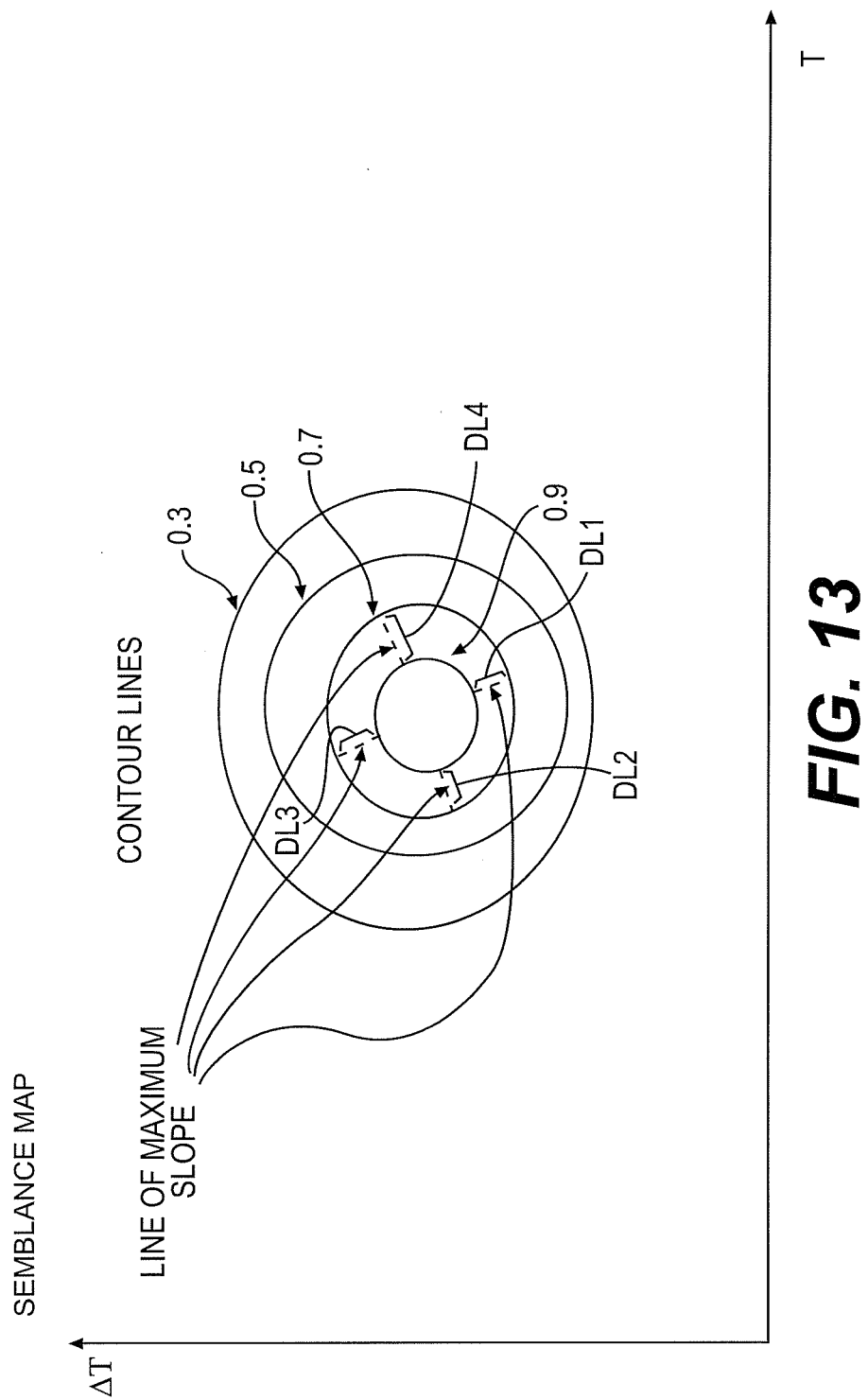
FIG. 13 is a detailed illustration of contour lines near a single peak in a semblance map, where lines of maximum slopes are indicated.

When performing detection of a seismic wave, the reliability of the detection is often relevant. The first element to characterize the quality of the detection is the value of the semblance coefficient, which suggests the quality of the match between the received signals on the sensors inside the group of sensors. A second element which can be used to characterize the quality of the detection is the sharpness of the detection, based on the sharpness of the "hill" defined by the contour lines in the semblance map. If the "hill" is quite abrupt, the exact position of the peak is more evident. This increases the accuracy of T and ΔT. In some embodiments, methods according to this disclosure characterize the "contour line hill" sharpness by a formula. One embodiment of methods according to this disclosure is illustrated in FIG. 13 and is based on the average "slope" between two contour lines in the vicinity of the peak. The two contour lines may correspond to contour lines for a semblance value such as 0.9 and 0.7.

In some embodiments, the methods described herein consider several lines of "max slope" spread around a particular semblance peak. For each of these lines i, the horizontal spacing between the 2 contour lines is estimated and then the slope can be calculated as:

$Slope_i = (0.9 - 0.7) / \Delta L_i$ (This is the tangent of the slope).

Then the average slope can be calculated as:

$Slope_{Av} = \Sigma Slope_i$ for $i = 1$ to $N$ where N is the number of lines of maximum slope considered around the specific peak. In the example of FIG. 13, N=4.

If the semblance map includes M peaks, there will be M average slopes:

the $Slope_{Av}J$ is the value of SlopeAv for the peak J; and then the $Slope_{Av}J$ can be normalized to the average of all slopes to provide a measure on the sharpness of the peak J:

$$SharpnessJ = \frac{Slope_{Av}J}{(\Sigma Slope_{Av}i)/N}.$$

Other methods can also be considered to define the average sharpness of a hill in the semblance map.

The peak sharpness can be used to characterize the quality of a peak, for example, for simultaneously processing multiple peaks (such as the process to determine the best reflector definition across multiple groups and even multiple shots).

The methods according to this disclosure are based on "semblance processing" and generally involve three steps: semblance map processing; single shot data map handling; multiple shot data map handling. In some embodiments, the seismic receiver system includes several receiver subsystems which can be grouped for "semblance processing," as the first step in the methods of this disclosure. "Semblance processing" can be performed for each group of sensors and one "semblance map" generated per group: this is the "group semblance map."

With respect to the hardware described in FIG. 2, three "group semblance maps" can be generated at each shot. As already explained, the data can first be processed at the group level by applying "semblance processing" within sensors of each group. This provides one semblance map per group. In each semblance map, a processing is applied to locate the peaks of semblance (which corresponds to the signal arrival at that group). This search for peaks can be performed via multiple techniques. When the N peaks are located on each map, then each map is cleaned from the "noise". One cleaning method is to reject all data from the map if the data is not inside the threshold contour line around each peak. 0.75 or 0.5 may be used as threshold for the contour line (every area not included inside that contour line would be set to zero): this would give the "cleaned group semblance map". Another method is to calculate the RMS amplitude over the whole semblance map. Then, all points of the semblance map with amplitudes lower than the RMS amplitude is "muted" to zero.

Figure 14:
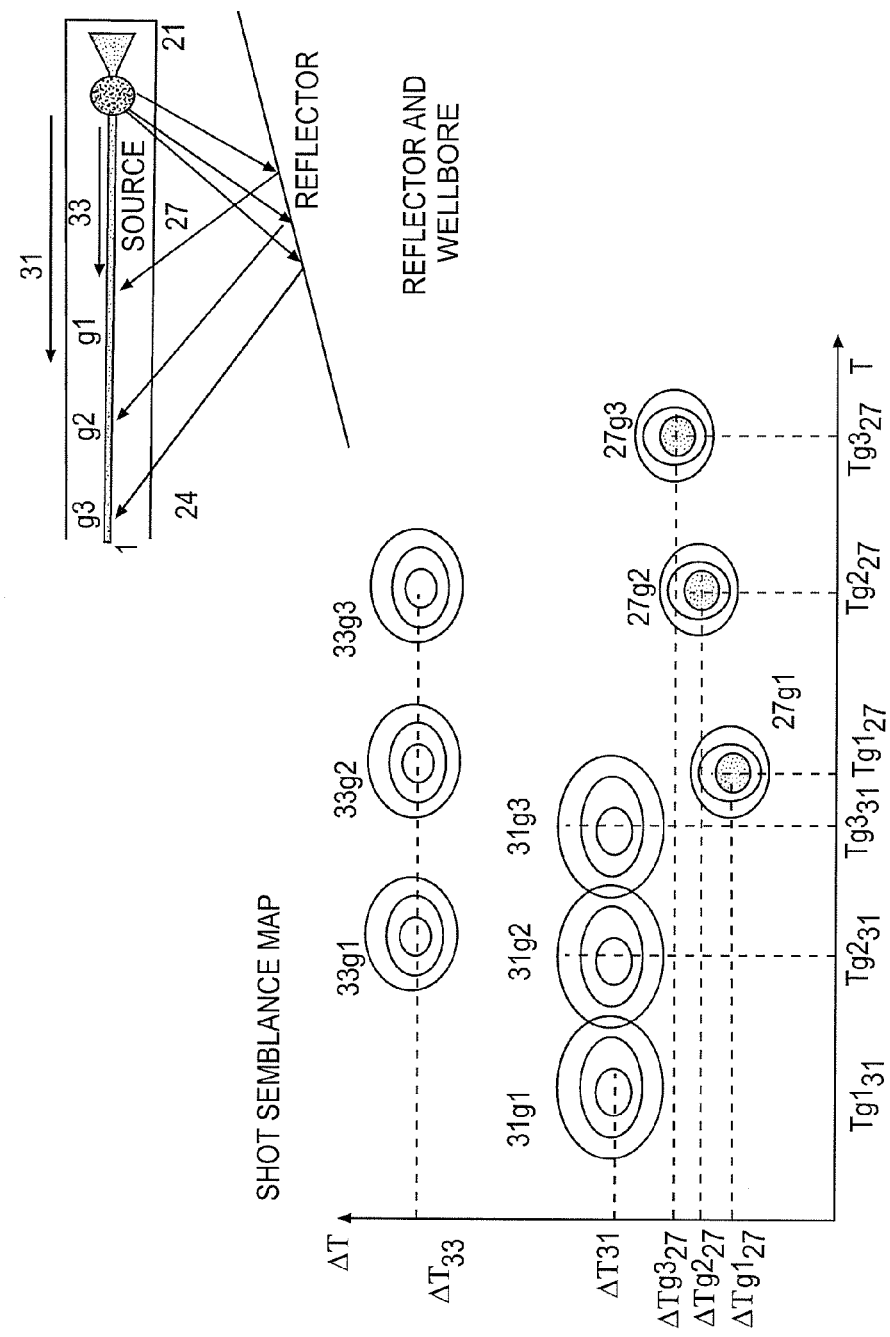
FIG. 14 describes a semblance map for the set of groups of sensors in the illustrated embodiment of a receiver system.

After the noise is removed, the "cleaned single shot map" can be created by superimposing the set of cleaned group semblance maps (as shown in FIG. 14) as a second step in the methods of this disclosure. In other words, the group semblance maps may be displayed as a single map:

The T axis starts at the same 0 (firing of the source), while the full scale for this T axis is the maximum of the full T scale of each individual map.

The $\Delta T$ axis also starts at the same 0 (firing of the source), while the full scale for this $\Delta T$ axis is the maximum of the full $\Delta T$ scale of each individual map.

This provides the semblance map for the "single shot" (called "single-shot semblance map" or "shot semblance map"). As an example, assume the number of groups is Nsg. In the "single shot semblance map," each reflector is characterized by Nsg hills with Nsg peaks.

The Nsg peaks are close to one another. The variation of their positions depends on the geometry (position of the reflector versus the wellbore). An example is shown in FIG. 14.

The tube wave 33 needs a longer time to reach groups farther from the source. However, the $\Delta T$ is the same for all groups when the sensor spacing within a group is identical between groups.

The formation direct arrival 31 also needs a longer time to reach groups farther from the source. However, the $\Delta T$ is the same for all groups (if the sensor spacing within the group is identical between groups).

The reflected wave 27 also needs more time to reach groups farther from the source, as the travel path is longer, which means the arrival T is then longer. In that case, it should be noted that the incident angle increases with the offset to the source, which translates into longer $\Delta T$ for more remote groups (as shown in FIG. 14). The change in $\Delta T$ is defined by the formula "normal move-out for inclined reflector" given in time domain, as applied to the formula for the most remote sensors in each group.

In some embodiments, working with multiple groups may have the benefit of improving the overall signal-to-noise ratio of the received signal and boosting the quality of the detected signal arrivals.

After superimposing the group maps to form the single shot map, the peaks corresponding to the "equivalent signals" may be flagged to allow further stacking. The stacking can be performed in reference to one group (typically the closest to the middle of the receiver system or the mid-length). Other suitable techniques can be used for stacking reference along the receiver system.

Figure 15:
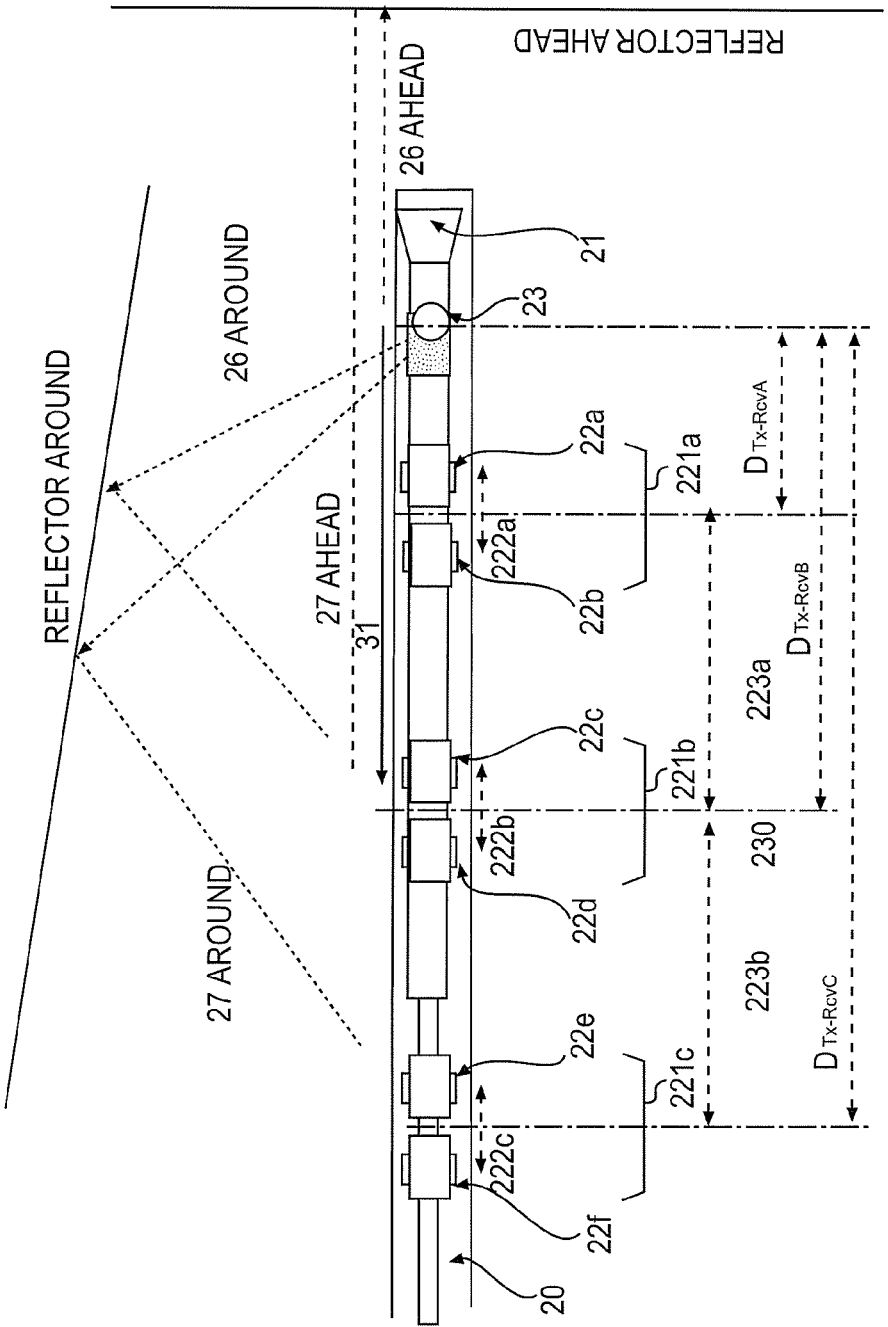
FIG. 15 is a detailed illustration of an embodiment of a seismic receiver system associated with a downhole source and in the vicinity of seismic reflectors.

The "shot" stacking of peaks related to the "seismic direct arrival" $31g1, 31g2, 31g3 \ldots$ can be performed to create a single "hill" based on the input of each individual hill $31g1, 31g2, 31g3 \ldots$ around the reference group (indicated as 230 in FIG. 15). As an example, RcvB is used as a reference.

The reference length is $D_{Tx\text{-}RcvB}$, which may be called Lmss (mid-length of seismic system).

Each point of each hill, which is characterized by (T, $\Delta T$), is shifted horizontally (following the axis T). The data related to seismic signal 31 is positioned into the "shot semblance map" as follows:

The data corresponding to $31g2$ are kept unchanged (as being the reference).

Data for peak $31g1$ (data above the semblance threshold around that peak) are shifted horizontally as ratio of lengths $(D_{Tx\text{-}RcvB}/D_{Tx\text{-}RcvA})$.

Similar shifting is performed for the peak $31g3$, with the ratio of lengths $(D_{Tx\text{-}RcvB}/D_{Tx\text{-}RcvC})$.

After the T shifting, a single "hill" with one "peak" characterizes the signal 31 including all data of each individual map. Then the contour lines and peak are re-processed for this "hill" or "integrated" set of the data, which can be performed in various ways (for example according to methods applicable for multiple sonic tool applications).

The peak location (in T and $\Delta T$) may now be less dependent on the noise present in the initial data; as it is based on typically K times more data (K being the number of sensor groups with individual semblance maps). The approximated value of the semblance coefficient for the peak in the stacked data set can be estimated as:

$$Ss31 = \text{square root } (\Sigma S_{i31}^2/K) \text{ for } i=1 \text{ to } K$$

where:

$S_{i31}$=semblance coefficient for the corresponding peak 31 in "group semblance map" of group i.

Ss31=the "average" semblance coefficient for that peak 31 at the shot level.

K=the number of groups in the receiver system.

When the stacking for the peak in the semblance map for wave 31 (seismic direct arrival) is completed, the Ts31 (time corresponding to the peak 31 after stack) may be used to determine the seismic velocity in the surrounding medium:

$$V_{formation1} = Ts31/Lmss$$

where:

$L_{mss}$=mid-length of seismic system (as defined above, or $D_{Tx\text{-}RcvB}$ in the example of FIG. 15)

$V_{formation1}$=seismic velocity in the surrounding medium.

A second estimate of the velocity can be obtained from $\Delta T$:

$$V_{formation2} = \Delta Ts31/Lrs$$

where:

$L_{rs}$=reference length of seismic group (222b in FIG. 2).

$V_{formation2}$=seismic velocity in the surrounding medium.

In theory, $V_{formation1}=V_{formation2}$. In some embodiments, in practical implementations, however, the average value of the 2 velocities can be used.

In some embodiments, a similar stacking process is performed for each wave propagating parallel to the wellbore. This includes the tube wave 33 as well as the "steel arrival" 30 (shown in FIG. 5).

Such processing would provide:

The semblance coefficient for "steel arrival": $Ss30=\Sigma S_{i30}^2/K$) for i=1 to K;

The semblance coefficient for "tube wave": $Ss33=\Sigma S_{i33}^2/K$) for i=1 to K.

The corresponding arrival time may be defined:

For "steel arrival," Ts30=time corresponding to the peak 30 after stacking;

For "tube wave," Ts33=time corresponding to the peak 33 after stacking.

The following velocity can also be calculated:

$$V_{steel-arrival}=Ts30/Lmss$$

$$V_{tube-wave}=Ts33/Lmss.$$

The corresponding velocities can be obtained from the $\Delta T$ and the group length (as with $V_{formation}$).

For reflected signals 27 (reflector around the wellbore), the formula "normal move-out for inclined reflector" can be used to define the reflector parameter ($D_{reflector}$, angle $\beta$), while allowing the "passage" from the "semblance map" into the 2D plane of seismic imaging. More specifically, $$T_i + T_r = \frac{D_{Tx-RevB} * \cos(\beta)}{V_{formation} * \sin\left(\arctan\left\{\frac{D_{Tx-RevB} * \cos(\beta)}{(2*D_{reflector} + D_{Tx-RevB} * \sin(\beta))}\right\}\right)}$$

As $D_{Tx-RevB}/V_{formation} = Ts31$, and $T_i + T_r = T27$ where $$T_{27} = \frac{Ts31 * \cos(\beta)}{\sin\left(\arctan\left\{\frac{D_{Tx-RevB} * \cos(\beta)}{(2*D_{reflector} + D_{Tx-RevB} * \sin(\beta))}\right\}\right)}$$

and $T_{27}$ defines the sum of the length of the paths for the incident ray and the reflected ray: $T_{27}*V_{formation}=L_i+L_r$.

Figure 16:
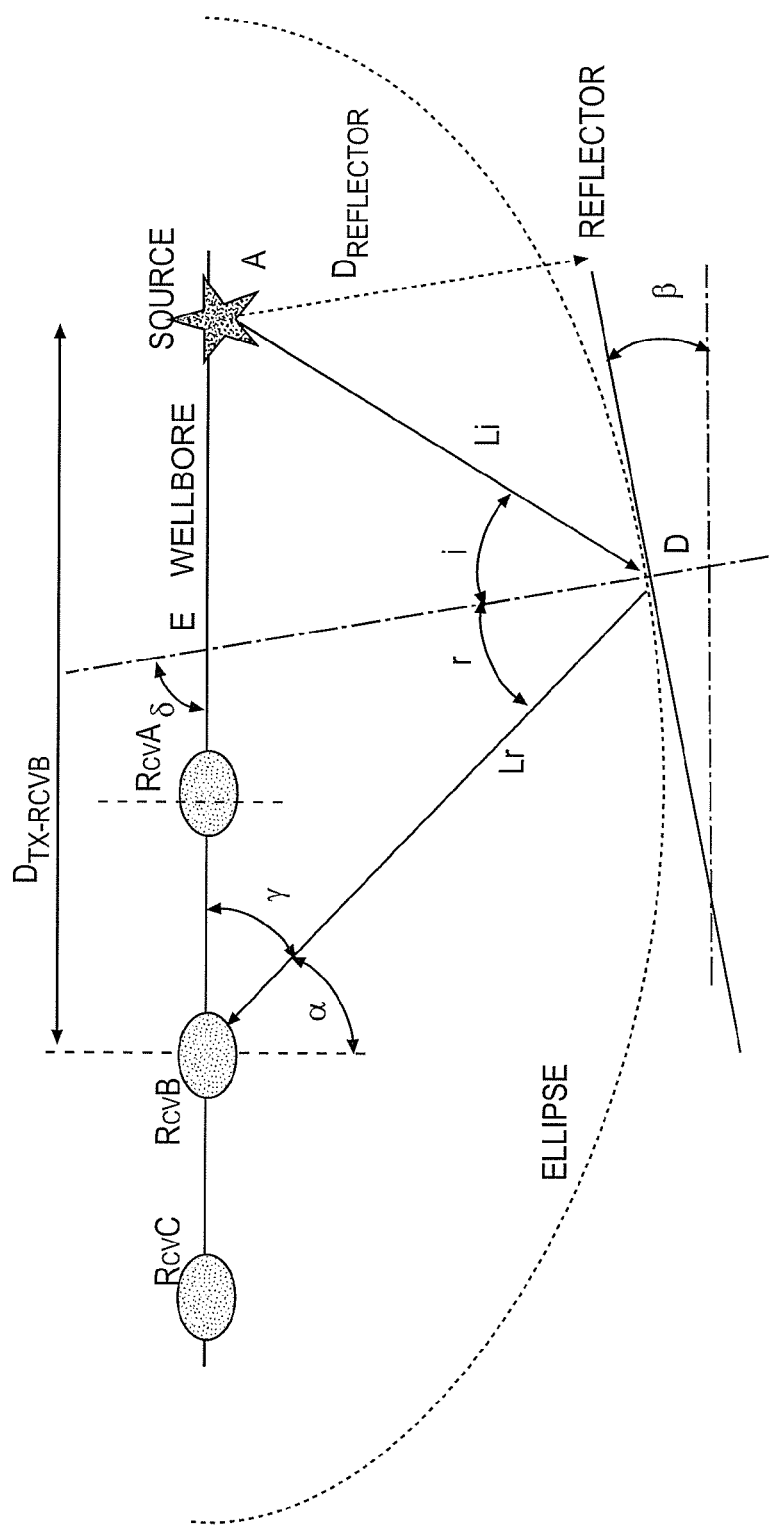
FIG. 16 represents a possible location of a reflector for a measurement by one sensor.

The incident ray starts at the source, and the received ray passes by the Rcv. As shown in FIG. 16, this means that the point D describes an ellipse of focal points A and B. Also by geometrical definition, the reflector which is perpendicular to the bissectrice of angle (i+r) (as i=r) is tangent to the ellipse at the point D. This fact can be used to position the reflector versus the three measurements $T_{27}g1$, $T_{27}g2$, $T_{27}g3$, converted first in equivalent lengths:

$$L_{27}g1=T_{27}g1*V_{formation}$$

$$L_{27}g2=T_{27}g2*V_{formation}$$

$$L_{27}g3=T_{27}g3*V_{formation}$$

$L_{27}g1$ with points S and A defines (geometrically) the ellipse 1.

$L_{27}g2$ with points S and B defines (geometrically) the ellipse 2.

$L_{27}g3$ with points S and C defines (geometrically) the ellipse 3.

Figure 17:
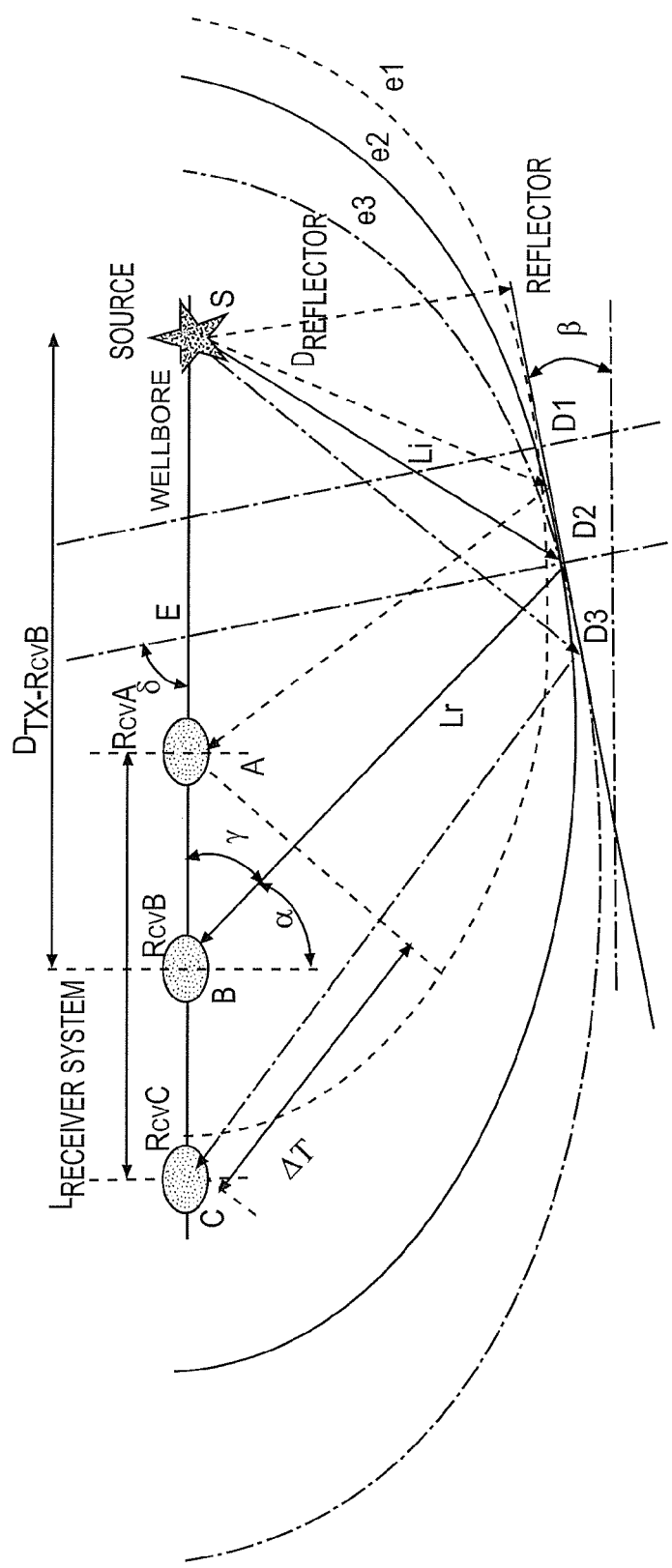
FIG. 17 represents a possible location of a reflector for a measurement by multiple sensors.
Figure 18:
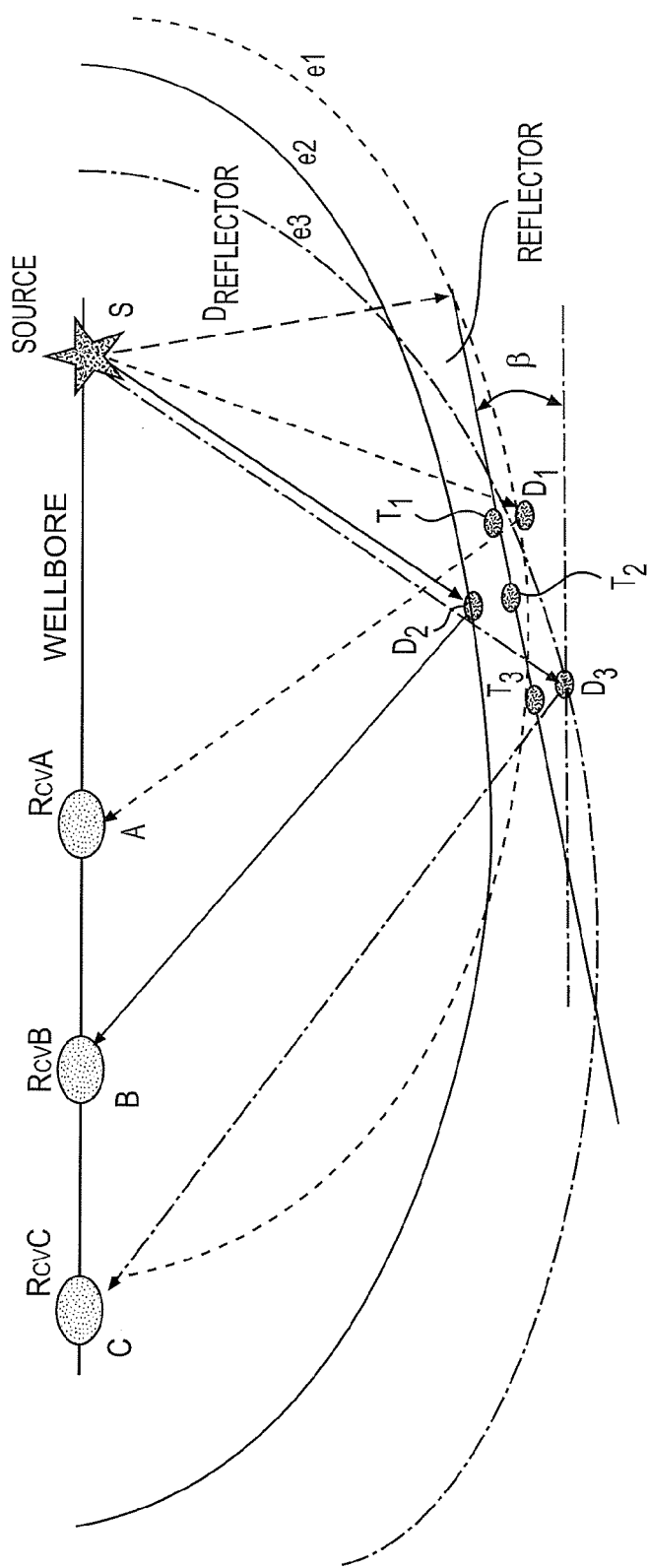
FIG. 18 represents "errors" involved in a possible location of a reflector for a measurement by multiple sensors.

These relationships are shown in FIG. 17. The common reflector is tangent to the three ellipses, at points D1, D2, and D3. In practical terms, the reflector (estimation of the common tangent to N circles) is defined as the line which minimizes the error (discussed further below with reference to FIG. 18), where the line is defined by 2 parameters (to define the equation $Y=a X+b$). The error can be estimated as follows:

$$Error_{dist} = \frac{\text{Square root}\left\{\sum (Ti - D_i)^2\right\}}{N}$$

for i=1 to K
where:

K is the number of groups in the receiver system.

Ti and Ei are the closest points between the line and the ellipse (these points can be determined by suitable processes).

The "error" may also include the error on incident angle at each sensor. The $\Delta T$ from the semblance map can be used to determine the measured incident $\alpha_{meas.}$ (as explained above). However for each parametric line, the points T are determined. Then the estimated ray path can be determined as S IR (as incident ray) and IR Rcv as the reflected ray, with IR being the point of the estimated line as point of incident and reflection. When angle i=angle r, only one ray exists from which the estimated incident angle $\alpha_{est}$ can be calculated.

An additional estimator based on the angle is the calculated: $Error_{angle}$:

$$Error_{angle} = \frac{\text{Square root}\left\{\sum (\alpha_{est.} - \alpha_{meas.})^2\right\}}{N}$$

for i=1 to K

The error to minimize would then be error=(Error$_{dist}$+Error$_{angle}$)/2.

The "Error" formula may be "improved" to include a weight for each term related to the semblance coefficient which indicates the "trust" in a given peak: for example, $$Error = \frac{\text{Square root}\left\{\sum (Ti - D_i)^2 * WF_{27}i\right\}}{N}$$

for i=1 to K
where $WF_{27}$ is a weighting factor related to the seismic arrival 27 at group i. $WF_{27}$ typically is a function of $S_{27}i$ and $RMS_{27i}$ and Sharpness 27i, where $S_{27}i$ is the semblance coefficient for seismic arrival 27 at group i.

$RMS_{27i}$ is the RMS of amplitude in the window W for shot semblance for arrival 27 at group i.

The determination of ($D_{reflector}$, angle $\beta$) for the reflector can be solved using an iterative approach as follows:

The reflector position is defined by $D_{reflector}$ and the angle $\beta$.

Loop on value of $D_{reflector}$
  Loop on angle $\beta$
    For each set ($D_{reflector}$, angle $\beta$)
      Define the points (T1, D1), (T2, D2), (T3, D3)
      Calculate the <<Error>>
      Compare this <<Error>> to the <<Error$_{minimum}$>>
        If smaller,
          this is the Error because the <<error$_{minimum}$>> and the current ($D_{reflector}$, angle $\beta$) is the "best answer".

This approach can be used to determine the reflector corresponding to the whole of measurement for the considered shot.

For a reflector ahead of the drill-bit (in fact the source is the reference) (such as R3 and R4 in FIG. 12), the "passage" from the semblance map into the 2D plane is more straightforward (refer to FIG. 15, where most of the numbers are equivalent to FIG. 2).

The seismic path ahead of the source for ray 26/27 is the total path from the source to the reflector and to the receiver minus the path between the source and that particular receiver.

$D1$=Distance source to reflector (as measured by group 1)=$(Tg1_{27} - Tg1_{31}) * V_{formation}/2$ $D2$=Distance source to reflector (as measured by group 2)=$(Tg2_{27} - Tg2_{31}) * V_{formation}/2$ $D3$=Distance source to reflector (as measured by group 3)=$(Tg3_{27} - Tg3_{31}) * V_{formation}/2$ $$DR2 = \frac{\sum Di}{N} \text{ for } i = 1 \text{ to } K \text{ } (K = \text{number of sensor groups});$$

"Error" =

$$\frac{\text{Square root} \sum (D_i - DR2)^2}{N} \text{ for } i = 1 \text{ to } K \text{ } (K = \text{number of groups}).$$

Figure 19:
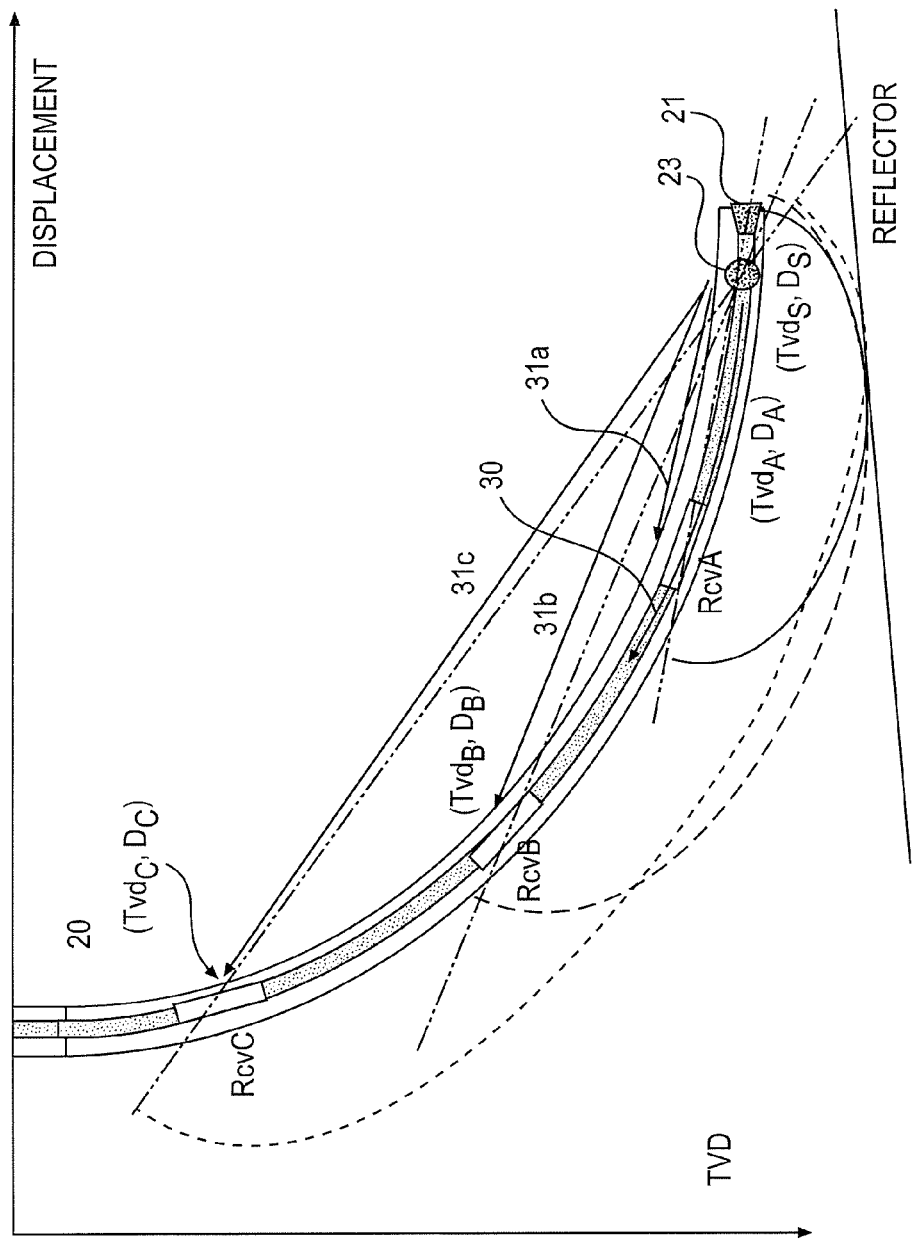
FIG. 19 represents a possible location of a reflector for a measurement by multiple sensors when the sensors are in a curved wellbore.

In some cases, the wellbore may be curved. The curvature can be in the range of about 10 deg/100 ft (or 10 deg/33 m). As the seismic receiver system may extend over a length of about 300 m, the total difference of well direction (inclination in the vertical plane) can be in the range of about 90 degrees. So, the well curvature should be taken into account. FIG. 19 is an illustration of such situation. The drill string 20 terminated by the drill bit 21 is inside the curved wellbore. 3 receiver subsystems (RcvA, RcvB, RcvC) are installed along the string. The seismic source 23 is also located in the string.

The wellbore is properly surveyed during drilling so that the wellbore trajectory is known. The length between the source and each Rcv is also known (typically as element from the driller fishing diagram). So, the corresponding TVD and horizontal displacement at the source and the receiver sub is known. Furthermore, these components are equipped with a D&I system allowing direct estimation of local well inclination and azimuth, and allowing direct calculation of wellbore trajectory and TVD and relative horizontal displacement of the RCV's versus the source.

When the wellbore is curved, the detection and processing of waves travelling in the wellbore may not be affected by the curve. This is true for the tube wave (not shown) and the steel arrival (30). For the direct arrival (from which the formation velocity may be determined), process correction may be needed. The direct arrivals 31 have different paths from the source to the 3 Rcv (A, B, C). The 3 rays are 31a, 31b, 31c. The respective length of their paths is not the linear distance along the drill string. The lengths of these paths are:

$L1$=square root$\{(Tvd_S - Tvd_A)^2 + (D_S - D_A)^2\}$;

L2 and L3 have similar formula for their respective length.

Figure 20:
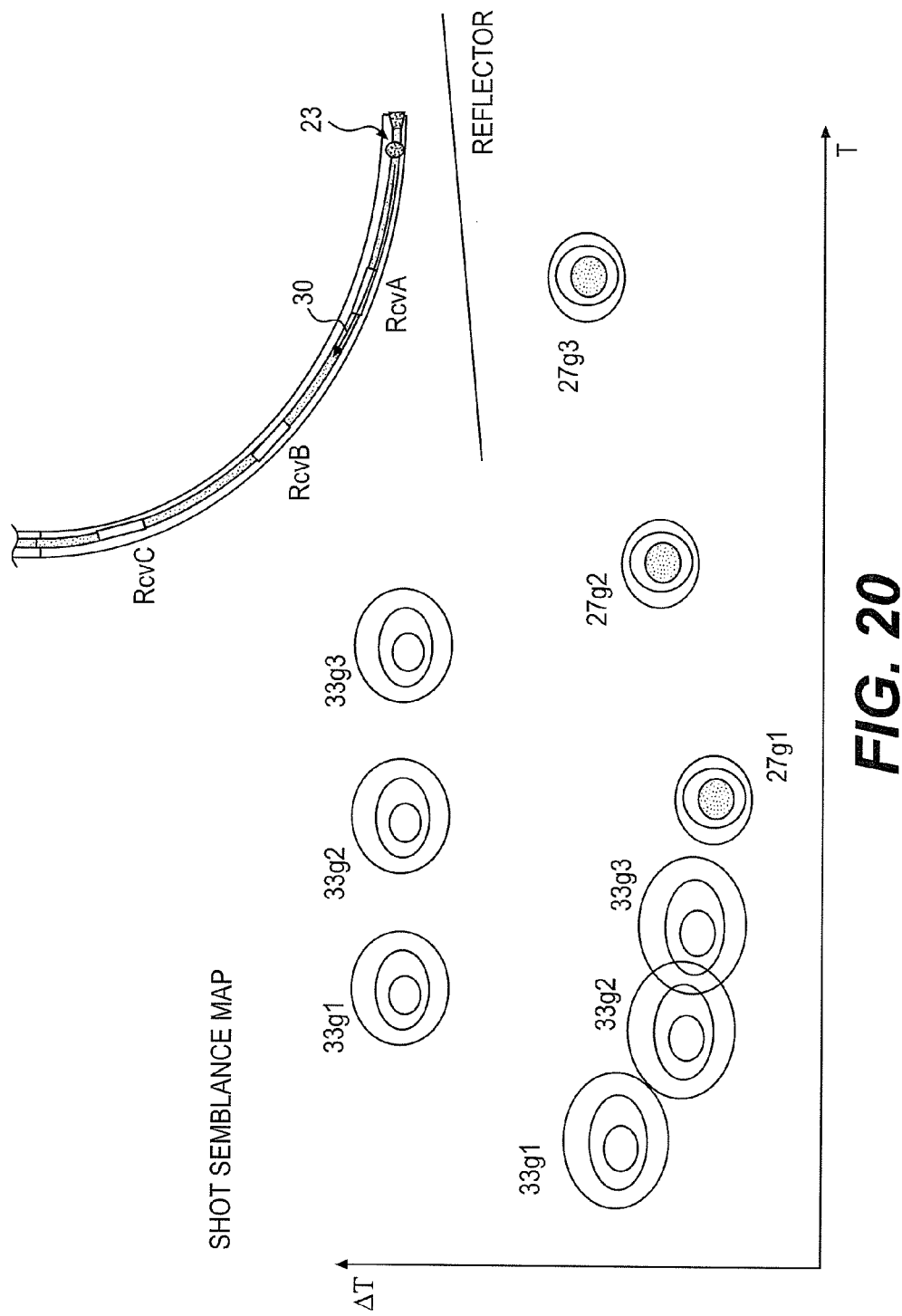
FIG. 20 is an illustration of a "shot semblance map" corresponding to a case of a seismic receiver system with a downhole source installed in a curved wellbore.

Also in such a geometry, the direct waves have "incident angles". This means that the semblance diagram would appear as in FIG. 20. The $V_{formation}$ can be calculated properly taking into account the corrected lengths L1, L2, L3, with no approximation required.

For the location of the reflector, in some embodiments, the process involving the placement of ellipse stays identical, knowing that the focal points stay at the source and the corresponding RCV. The only difference is that the main axes of the three ellipses are not aligned. No approximation is introduced due to the curvature, as long as the TVD and horizontal displacement for each element of the seismic system are known.

Figure 21:
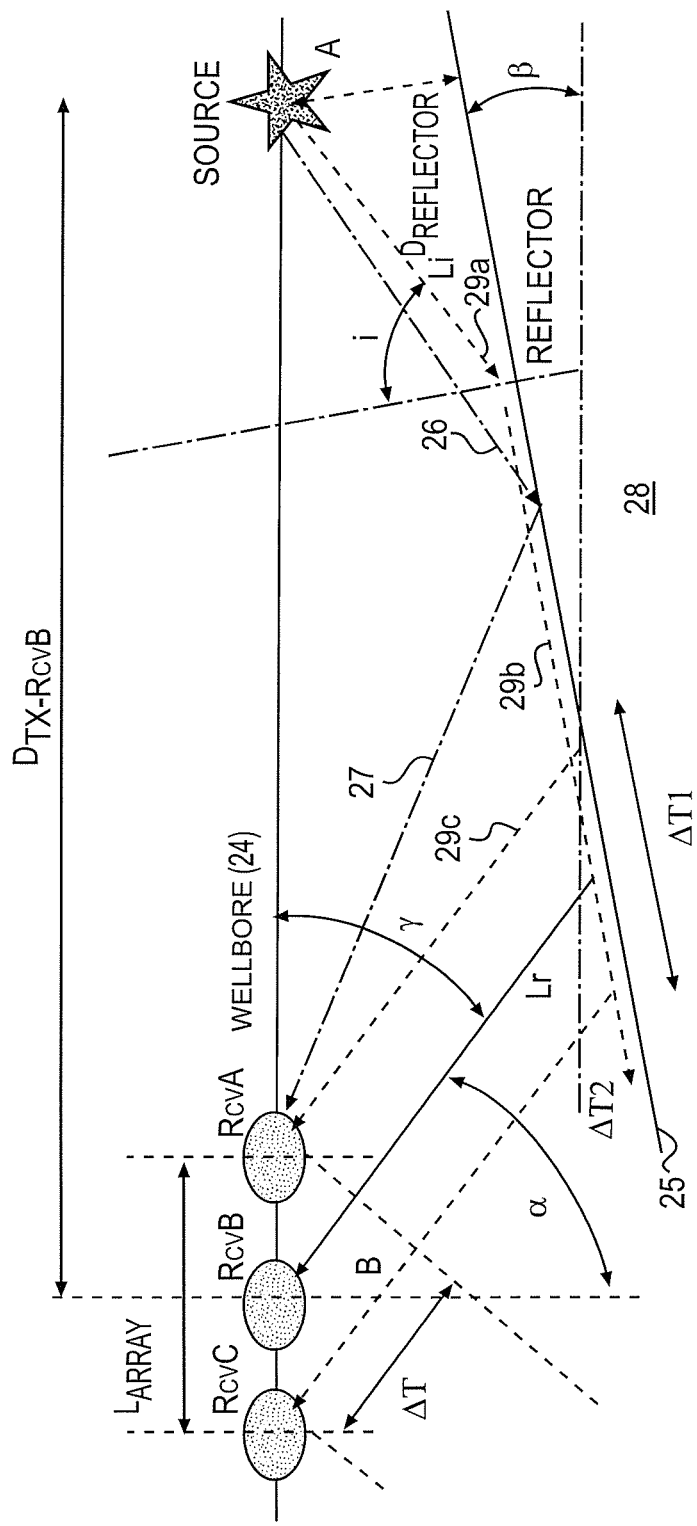
FIG. 21 is an illustration of refraction seismic with multiple sensors and a source installed in a wellbore.

Refracted wave detection is a particular case of a wave which appears to travel parallel to the wellbore. An illustration of this case is shown in FIG. 21. When the seismic velocity is higher in the formation 28 (after the interface 25) in comparison with the seismic velocity in formation 24, refraction occurs when the incident angle is the critical incident angle, the transmission cannot be established. The critical incident angle is given by the following formula:

$\sin(i) = V_{formation24}/V_{formation28}$ where $V_{formation24} = V_{formation}$ = seismic velocity in formation 24, $V_{formation28}$ = seismic velocity in formation 28 (below the interface 25).

With refraction, the path between the source and the receiver is made of 3 segments 29a, 29b, and 29c. The segment 29c is the refracted wave at the interface which propagates at $V_{formation28}$.

When the reflector is parallel to the wellbore, the $\Delta T$ corresponding to the arrival of the seismic system can be used to compute the propagating velocity at the reflector, and the travel time T from the source to Rcv can be used to determine $D_{reflector}$.

When the reflector is inclined as shown in FIG. 21, the time increment between Rcv's is constant as for any refraction seismic. However, this time increment includes $\Delta T1$ and $\Delta T2$ (both increase with distance). An extra measurement is used to solve the problem; in some embodiments, the extra measurement is the incident angle $\alpha$ measured at the group of sensors (as explained above).

The combination of the measured angle $\alpha$, the $\Delta T$ for the signal to arrive to 2 adjacent RCV of known separation, and the total travel time from the source to a RCV (of known spacing to the source) gives three independent measurements which can be used to resolve the three unknowns ($D_{reflector}$, $\beta$, $V_{formation28}$).

Figure 22:
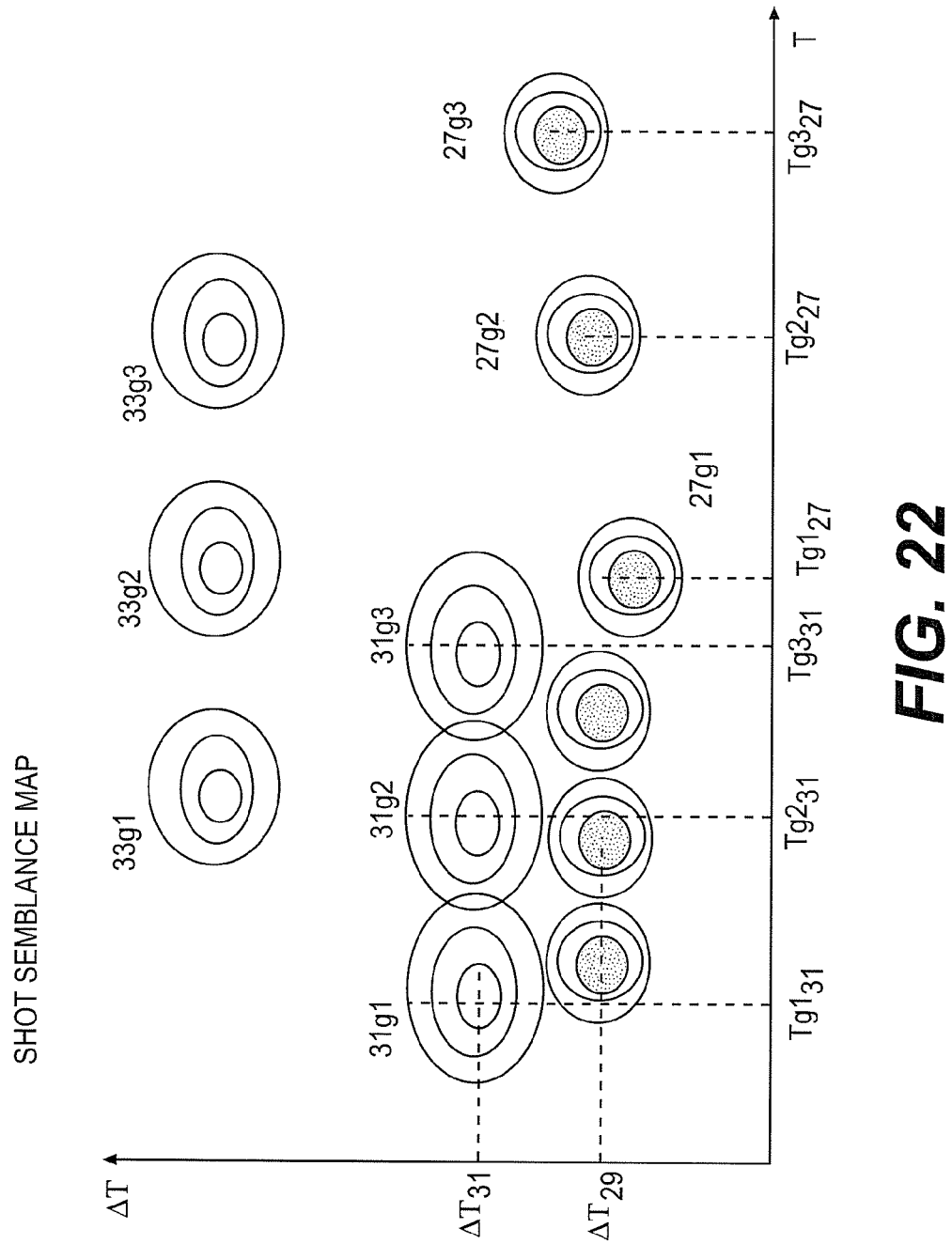
FIG. 22 represents a semblance map for a case of refraction seismic with multiple sensors and a source installed in a wellbore.

As illustrated in FIG. 21, when the reflector is at adequate distance versus the seismic system, the reflector can be detected first by refraction (via the path 29a, 29b, 29c), and also later by reflection (via the path 26, 27). The corresponding peaks are shown in the "shot semblance map" in FIG. 22. The peaks corresponding to the refraction event (detected by the three RcvA, RcvB, RcvC) appear at constant $\Delta T_{29}$. This delta time is smaller than $\Delta T_{31}$, as $V_{formation28}$ is higher than $V_{formation24}$. The seismic signal 29 also arrives at each group sooner as the reflected wave 27.

These methods may be applicable to "geosteering application" where refraction seismic may be common, as the first reflector below the horizontal drain may be very close to the wellbore. $D_{reflector}$ may be small in comparison with the length of the seismic receiver system.

Another issue can be solved due to the redundancy of the "semblance map" processing for seismic application. As explained above, $V_{formation}$ can be obtained from T and also $\Delta T$. In a single homogenous formation, this is redundant information. However, the distance between the source and the receiver may be that a "seismic interface" may be in between the source and the RCV group. Then, 2 values of $V_{formation}$ are present:

$V_{formation\text{-}Source}$=seismic velocity near the source; and
$V_{formation\text{-}group}$=seismic velocity at the sensor group.

ΔT can be used to calculate $V_{formation\text{-}group}$ but because the interface position is unknown, $V_{formation\text{-}source}$ cannot be calculated. However when the formation interface is between 2 adjacent sensor groups (called A and B), the ΔT corresponding to each group can be used to compute the $V_{formation}$ in front of each group, while the 2 Ts can be used to determine the axial position of the interface between the 2 groups.

In the text above, the discussion has been focused on resolving the "2D problem" where the reflector appears as one line in the given 2D planes containing the seismic source and receiver. In practice, the reflector can be positioned in 3D versus the wellbore.

Figure 23:
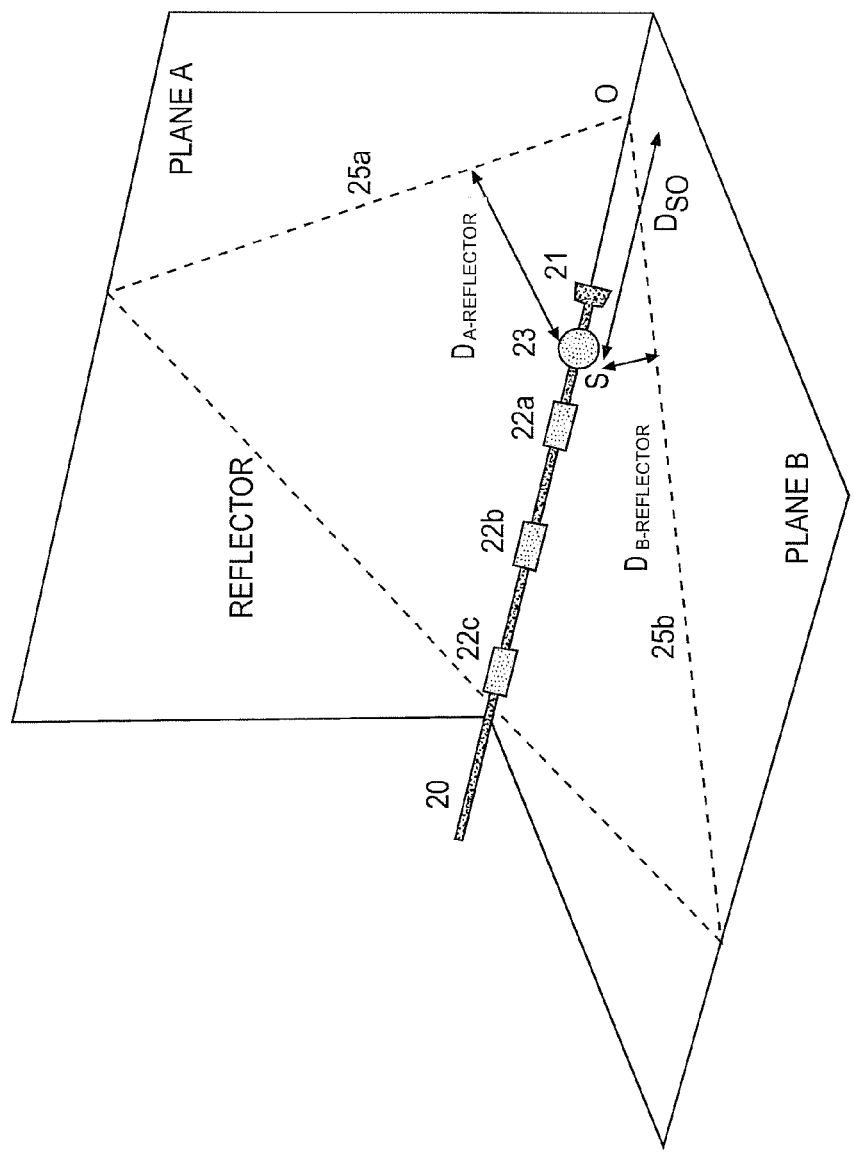
FIG. 23 describes a method to locate a reflector inclined in 3D versus a seismic system.

In a first 3D case, the wellbore is supposed to be straight over the length of the seismic system (see FIG. 23). In this case, the 3D problem is solved in 2 perpendicular planes A and B, with the wellbore being at the intersection of the 2 planes. FIG. 23 illustrates this situation with the drill-string 20 shown terminated by the drill-bit 21 and equipped with a seismic source 23 and 3 seismic receivers 22a, 22b, 22c. The 3D location of reflectors is solved as 2 times the "2D problems" in plane A and plane B. According to this approach, data measured with geophones (or accelerometers) are rotated in these planes A and B.

Then the "2D solutions" can be obtained in planes A and B. The solutions in these 2 planes are not independent:

The "steel arrival" (30) and tube wave 33 may be identical between the 2 solutions. In that case, one specific "shot semblance map" can be constructed including only the data for these waves in planes A and B. Then, the single hill is generated in the map (T, ΔT), allowing single determination of waves 30 and 33.

For the "formation direct arrival," when the wellbore is straight (as shown in FIG. 23), the regrouping of data for planes A and B can be performed as for waves 30 and 33.

For a reflector ahead of the bit and perpendicular to the wellbore, the processing previously described for the "2D seismic" applies also directly, as the wave 27 travels parallel to the straight wellbore, allowing similar processing for waves 30 and 33.

For a reflector inclined with different angles in the planes A and B, the solution includes the fact that the "single reflector plane" is defined by the 2 reflector lines 25a and 25b in the 2 planes A and B. These 2 lines converge on the point O:

$$D_{SO}=D_{Areflector}*\sin(\beta_A)=D_{Breflector}*\sin(\beta_B)$$

with $\beta_A$=angle β in plane A as defined in FIG. 8; and
$\beta_B$=angle β in plane B as defined in FIG. 8.

The reflector is determined by the 2 intersecting lines 25A and 25B in the reference planes A, B. In each plane, that line can be characterized by $D_{reflector}$ (distance from source to reflector) and by either the angle β or the distance $D_{SO}$ (distance between the source and the intersection point O).

The determination of ($D_{Areflector}$, angle β) for the reflector can be solved by an iterative approach. In the similar method as used to determine ($D_{reflector}$, angle β) for the 2D seismic, here the determination of the best fitted reflector is performed by minimizing the "error" as follows:

Loop on value of $D_{Areflector}$
Loop on angle $\beta_A$ $$D_{SO}=D_{Areflector}/\sin(\beta_A)$$

Loop on angle $\beta_A$ $$D_{Breflector}=D_{SO}*\sin(\beta_B)$$

For each set ($D_{Areflector}$, angle $\beta_A$, angle $\beta_B$)
In plane A
Define the points (T1, D1), (T2, D2), (T3, D3)
Calculate the <<$error_A$>> in plane A
In plane B
Define the points (T1, D1), (T2, D2), (T3, D3)
Calculate the <<$error_B$>> in plane B
Calculate "$ERROR_{AB}$"=square root ($error_A^2$+$error_B^2$)/2
Compare this "$ERROR_{AB}$" to the <<$error_{minimum}$>>
If smaller,
this error because the <<$error_{minimum}$>>
and
the current ($D_{Areflector}$, angle $\beta_A$, angle $\beta_B$)
is the "current best answer."

This allows the final determination of the one reflector corresponding to all of the measurements (in the 2 planes) for the considered shot.

The general 3D case with a curved wellbore can be solved using a similar logic.

The case of a surface source and downhole seismic receiver system can be processed with similar semblance processing, in view of locating a few reflectors (typically less than 10) in the vicinity (typically less than about 500 meters) of the wellbore. In some embodiments, a benefit of such semblance processing may again be related to limited bandwidth telemetry from downhole to surface, as well as fast processing method enabling real-time decision-making for geosteering.

Figure 24:
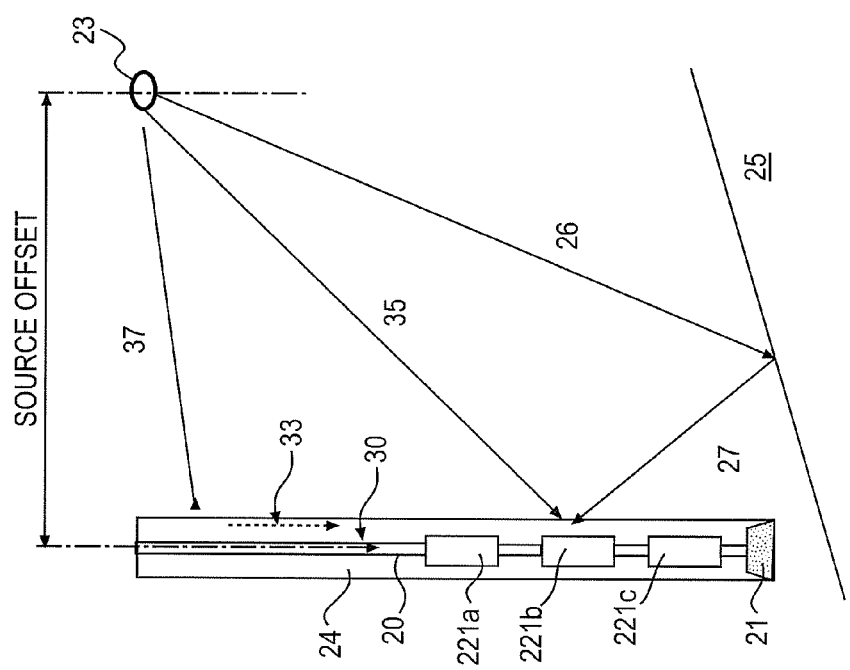
FIG. 24 describes a seismic system and ray paths associated with a surface source.

A situation is illustrated in FIG. 24 with a single reflector 25 below the bit (21). Three receiver groups (221a, 221b, 221c) are integrated in the drill-string 20. Each group will include multiple seismic sensors distributed along the drill-string axis, where some of the sensors of one group may be included in different receiver subsystems.

The seismic source 23 is at surface, installed at a given offset from the wellbore.

Each receiver detects:
The direct arrival 35
The reflected wave 27
Potentially some "steel arrival" 30 coupled to the source by rays 37
Potentially some tube wave 33 coupled to the source by rays 37.

Figure 25:
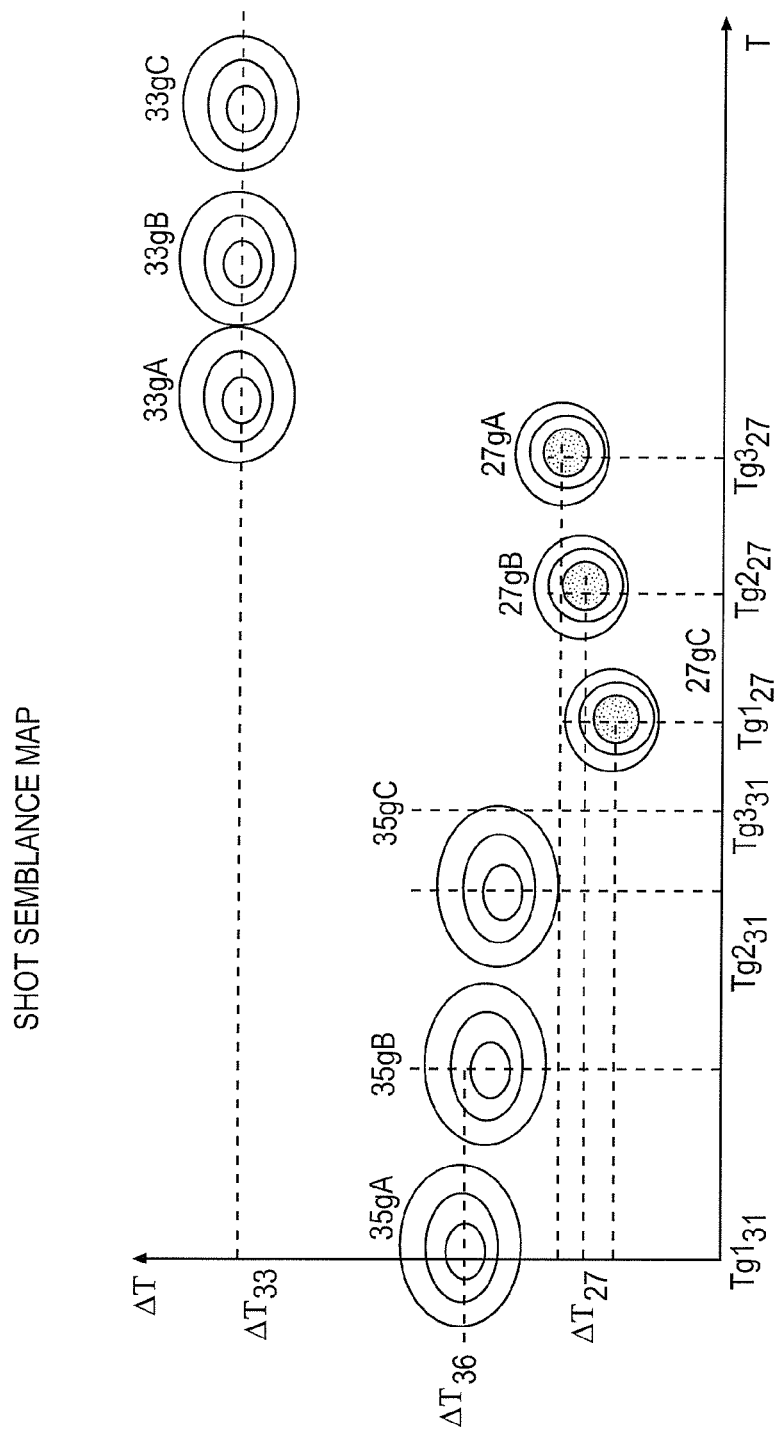
FIG. 25 represents a semblance map for a case of a seismic system associated with a surface source.

In this case, the T0 for the T axis of the semblance map is the arrival time for wave 25. An illustration of the corresponding "shot semblance map" is shown in FIG. 25. The T0 is the arrival time for the direct path to the closest receiver group (RcvA).

For the tube wave 33 travelling in the wellbore, the ΔT is represented to be the same; presuming the same sensor inter-spacing in each group. The time T increases with the depth of the group in the wellbore, and is a constant time increment between groups, presuming that the inter-spacing between groups is constant. Otherwise ΔT and T would be adjusted in relation to the inter-distance of interest.

For the direct arrival 35, the arrival T increases with the depth of the group. Trigonometry (or geometry) enables evaluating the dependence with the source offset. The ΔT is shown to decrease slightly for the deeper group as the incident angle decreases slightly with depth. This increment for T as well as the change for ΔT between groups can be estimated by trigonometry knowing the inclination of the wellbore, the depth and the source offset.

Similar considerations apply for the reflected wave 27.

Using NMO ("Normal Move-Out") correction as for surface seismic, it is possible to stack the "hill" corresponding to one type of seismic signal as detected by multiple groups. In relation to NMO for surface seismic, the TVD of the group and the offset from the group to the source is taken into account in the ray travel.

When a surface source is used, refraction seismic can also be handled when occurring. The source offset from the wellbore can be relatively large. The processing is based on methodology similar to the case of refraction seismic when using downhole source.

In reference to FIG. 4, the sensor 69 of the receiver subsystem is used to determine the direction of propagation of the seismic wave (from which point the wave is arriving and towards which point the wave is moving). This is useful information to solve the potential unknown as shown in FIG. 11 of whether the reflector is the solid line or the dotted line. This extra input is desired for a full solution of the reflector's unique location.

As explained previously, the data are first processed at the group level ("group semblance map). Then extra processing is performed to determine the unique reflector which minimizes the "error" function while combining all data related to a single shot. After this second step, a third data integration is performed to include the multiple data sets corresponding to successive shots at different positions (source or/and receiver system). This third step can be similar to the second step as a parametric positioning of the reflector to minimize a similar "error function". In practice, step 2 and step 3 can be performed simultaneously or in successive steps.

A number of embodiments have been described. Nevertheless it will be understood that various modifications may be made without departing from the spirit and scope of the disclosure. Accordingly, other embodiments are included as part of the disclosure and may be encompassed by the attached claims. For example, the reflector description has been based on a line (in 2D plane). However, a more complex representation can be used, as long as there are enough data redundancy for the best fitting. Furthermore, the foregoing description of various embodiments does not necessarily imply exclusion. For example, "some" embodiments or "other" embodiments may include all or part of "some," "other" and "further" embodiments within the scope of this disclosure.

What is claimed is:

1. A method for investigating a formation surrounding a wellbore, comprising:
   a) firing a seismic source located downhole or at surface;
   b) recording data relating to acoustic waves generated by the seismic source using one or more groups of downhole receivers, wherein each group has one or more receivers; and
   c) processing the data according to a semblance technique comprising group semblance mapping, the group semblance mapping comprising processing signals from a plurality of the receivers to determine consistent signals related to a same seismic event, the processing comprising sliding an observation time window of a given width along a time axis.

2. A method according to claim 1, wherein when the semblance technique is performed on data recorded by multiple receiver subsystems, the recorded data is normalized to a common reference axis using a coordinate rotation process.

3. A method according to claim 1, further comprising: optimizing a number of the downhole receivers in the groups.

4. A method according to claim 1, further comprising: identifying a location, orientation, or both of ten or fewer bed boundaries, which are up to about 500 meters around and ahead of the wellbore.

5. A method according to claim 1, wherein the seismic source comprises: at least two force generating members retractably connected to a drill-string tubular at substantially a same axial position; and a control system for activating the at least two force generating members to engage the wellbore and transmit a seismic signal comprising a swept frequency signal ranging up to about 700 Hz into the formation surrounding the wellbore.

6. A method according to claim 1, wherein each of the one or more groups of downhole receivers comprises at least two, same-type, axially spaced-apart hydrophones affixed to a drill-string tubular, at least one multi-component geophone, and mechanical elements for stable acoustic coupling of receivers to a seismic signal travelling in the surrounding formation.

7. A method according to claim 6, wherein the one or more groups of downhole receivers comprise two to four groups.

8. A method according to claim 1, wherein the recorded data corresponds to acoustic waves generated by a low frequency source of frequencies ranging from about 5 Hz to about 500 Hz.

9. A method according to claim 1, wherein the group semblance mapping is performed by one or more downhole processors.

10. A method according to claim 1, wherein group semblance mapping comprises: generating a semblance map for each group of receivers, and at least partially removing noise from each semblance map to create cleaned group semblance maps; and creating a cleaned single shot semblance map by stacking the cleaned group semblance maps.

11. A method according to claim 1, wherein data related to each reflector detected by semblance mapping at group level is integrated among multiple groups at a shot level by determining a reflector that allows minimization of a fitting error function.

12. A method according to claim 11, wherein the error function is a distance error determined from an ellipse position for reflector(s) in each group that is weighted by semblance peak amplitude, sharpness, peak RMS amplitude, or a combination thereof.

13. A method according to claim 1, further comprising performing 3D positioning of reflectors by determining the reflectors in two independent planes containing locally and approximately the wellbore at an intersection of the two planes, wherein the reflectors have a common intersection at the intersection of the two planes.

14. A method according to claim 1, wherein additional waves travelling parallel to the wellbore are also detected, allowing noise reduction and determination of seismic velocities in the formation for determination of distance of a reflector close to the wellbore.

15. A method according to claim 1, wherein seismic signals travelling across the formation comprise P-waves, S-waves, refraction waves or combinations thereof.

16. A system for investigating a formation surrounding a wellbore, comprising:
   a seismic source;
   one or more groups of downhole receivers, wherein each group of receivers comprises one or more receivers;
   a surface electronics subsystem; and
   a downhole electronics subsystem, wherein the surface and downhole electronics subsystem are configured to cooperate in processing data recorded by the one or more groups of receivers according to a process comprising group semblance mapping to detect a location, orientation, or both of up to ten bed boundaries and up to about 500 meters around or ahead of the wellbore, the group semblance mapping comprising processing signals from a plurality of the receivers to determine consistent signals related to a same seismic event, the processing comprising sliding an observation time window of a given width along a time axis.

17. A system according to claim 16, further comprising: at least one sensor configured to determine orientation of each of the one or more groups of receivers relative to an earth gravity vector, an earth magnetic vector or both.

18. A system according to claim 16, wherein the seismic source comprises: at least two force generating members retractably connected to a drill-string tubular at substantially a same axial position; and a control system for activating the at least two force generating members to engage the wellbore and transmit a seismic signal comprising a swept frequency signal ranging up to about 700 Hz into the formation surrounding the wellbore.

19. A system according to claim 18, wherein the swept frequency ranges from about 5 Hz to about 500 Hz.

20. A system according to claim 16, wherein each of the one or more groups of downhole receivers comprises at least two, same-type, axially spaced-apart hydrophones affixed to a drill-string tubular, at least one multi-component geophone, and mechanical elements for stable acoustic coupling of receivers to a seismic signal travelling in the surrounding formation.

* * * * *